United States Patent
Bonafonte et al.

(10) Patent No.: US 11,367,431 B2
(45) Date of Patent: Jun. 21, 2022

(54) SYNTHETIC SPEECH PROCESSING

(71) Applicant: Amazon Technologies, Inc., Seattle, WA (US)

(72) Inventors: Antonio Bonafonte, Cambridge (GB); Panagiotis Agis Oikonomou Filandras, Greater London (GB); Bartosz Perz, London (GB); Arent van Korlaar, London (GB); Ioannis Douratsos, Cambridge (GB); Jonas Felix Ananda Rohnke, Bassingbourn (GB); Elena Sokolova, London (GB); Andrew Paul Breen, Norwich (GB); Nikhil Sharma, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 16/818,542

(22) Filed: Mar. 13, 2020

(65) Prior Publication Data

US 2021/0287656 A1    Sep. 16, 2021

(51) Int. Cl.
| | | |
|---|---|---|
| *G10L 13/10* | (2013.01) | |
| *G10L 13/047* | (2013.01) | |
| *G10L 15/16* | (2006.01) | |
| *G10L 15/18* | (2013.01) | |
| *G10L 15/22* | (2006.01) | |

(52) U.S. Cl.
CPC ............ *G10L 13/10* (2013.01); *G10L 13/047* (2013.01); *G10L 15/16* (2013.01); *G10L 15/1815* (2013.01); *G10L 15/22* (2013.01); *G10L 2015/223* (2013.01)

(58) Field of Classification Search
CPC .... G10L 13/00–2013/105; G10L 15/00–15/34
See application file for complete search history.

(56) References Cited

U.S. PATENT DOCUMENTS

| | | | |
|---|---|---|---|
| 2018/0233143 A1* | 8/2018 | Papangelis | G10L 15/16 |
| 2019/0197121 A1 | 6/2019 | Jeon et al. | |
| 2020/0082807 A1 | 3/2020 | Kim et al. | |
| 2020/0302927 A1* | 9/2020 | Andruszkiewicz | G06F 40/44 |
| 2021/0081609 A1* | 3/2021 | Johnson | G06F 40/242 |
| 2021/0141799 A1* | 5/2021 | Steedman Henderson | G06F 16/243 |

FOREIGN PATENT DOCUMENTS

| | | |
|---|---|---|
| WO | 2019175574 A1 | 9/2019 |

OTHER PUBLICATIONS

International Search Report and Written Opinion issued in International Patent Application No. PCT/US2021/019373, dated May 25, 2021, 12 pages.

(Continued)

*Primary Examiner* — Abul K Azad
(74) *Attorney, Agent, or Firm* — Pierce Atwood LLP

(57) ABSTRACT

A speech-processing system receives both text data and natural-understanding data (e.g., a domain, intent, and/or entity) related to a command represented in the text data. The system uses the natural-understanding data to vary vocal characteristics in determining spectrogram data corresponding to the text data based on the natural-understanding data.

20 Claims, 16 Drawing Sheets

(56) References Cited

OTHER PUBLICATIONS

Wang, et al., "Uncovering Latent Style Factors for Expressive Speech Synthesis," eprint arXiv:1711.00520, Nov. 1, 2017, 5 pages.
Kingma, et al., "Auto-Encoding Variational Bayes," arXiv:1312.6114v10 [stat.ML] May 1, 2014, 14 pages.
Prateek, et al., "In Other News: A Bi-style Text-to-speech Model for Synthesizing Newscaster Voice with Limited Data," arXiv:1904.02790v1 [cs.CL] Apr. 4, 2019, 9 pages.
Stanton, et al., "Predicting Expressive Speaking Style from Text in End-To-End Speech Synthesis," arXiv:1808.01410v1 [cs.CL] Aug. 4, 2018, 8 pages.
Subramanian, et al., "Multiple-Attribute Text Style Transfer," Proceedings of International Conference on Learning Representations, arXiv:1811.00552v2 [cs.CL] Sep. 20, 2019, 20 pages.
Sutskever, et al., "Sequence to Sequence Learning with Neural Networks," arXiv:1409.3215v3 [cs.CL] Dec. 14, 2014, 9 pages.
Zhang, et al., "Learning Latent Representations for Style Control and Transfer in End-To-End Speech Synthesis," arXiv:1812.04342v2 [cs.CL] Feb. 14, 2019, 5 pages.

\* cited by examiner

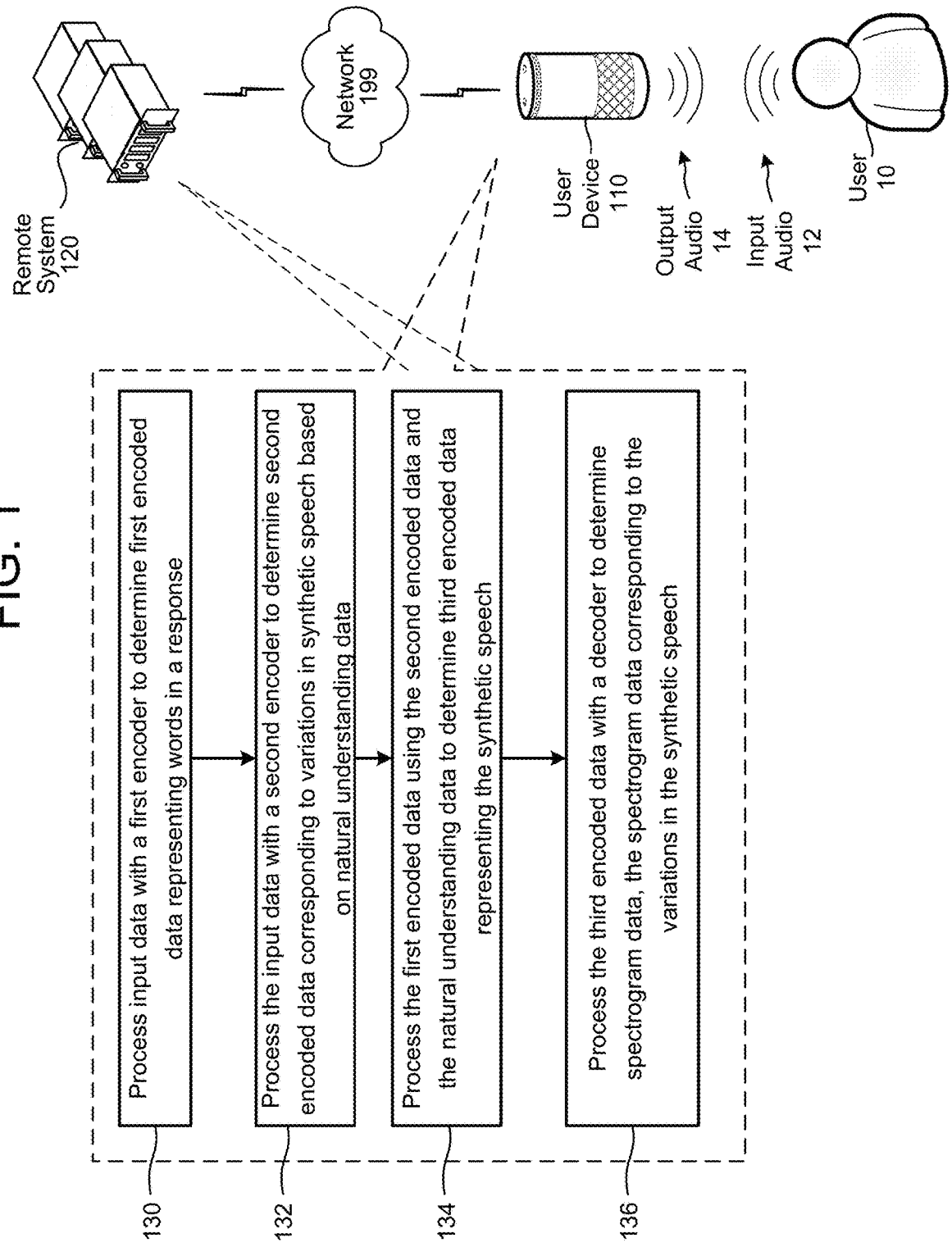

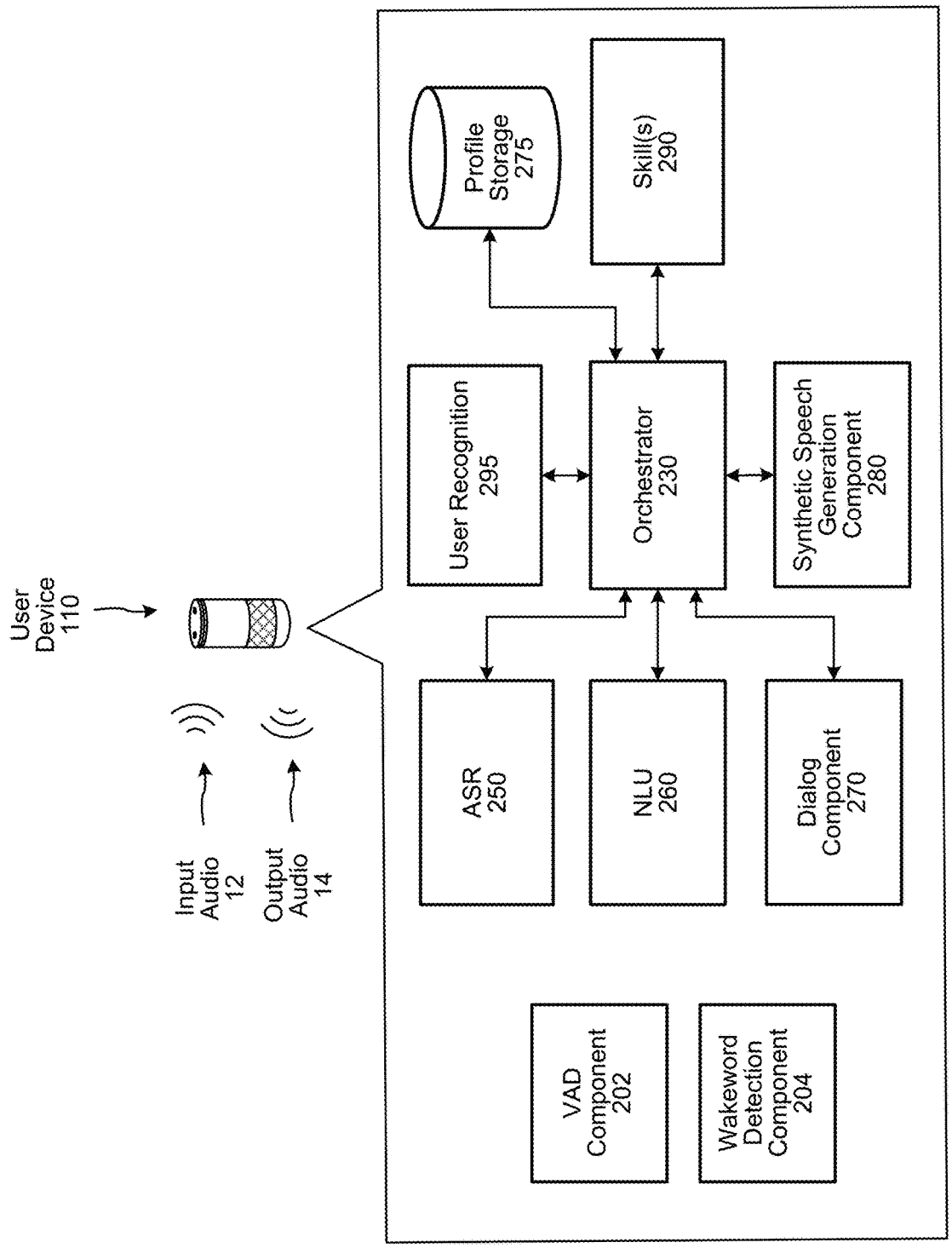

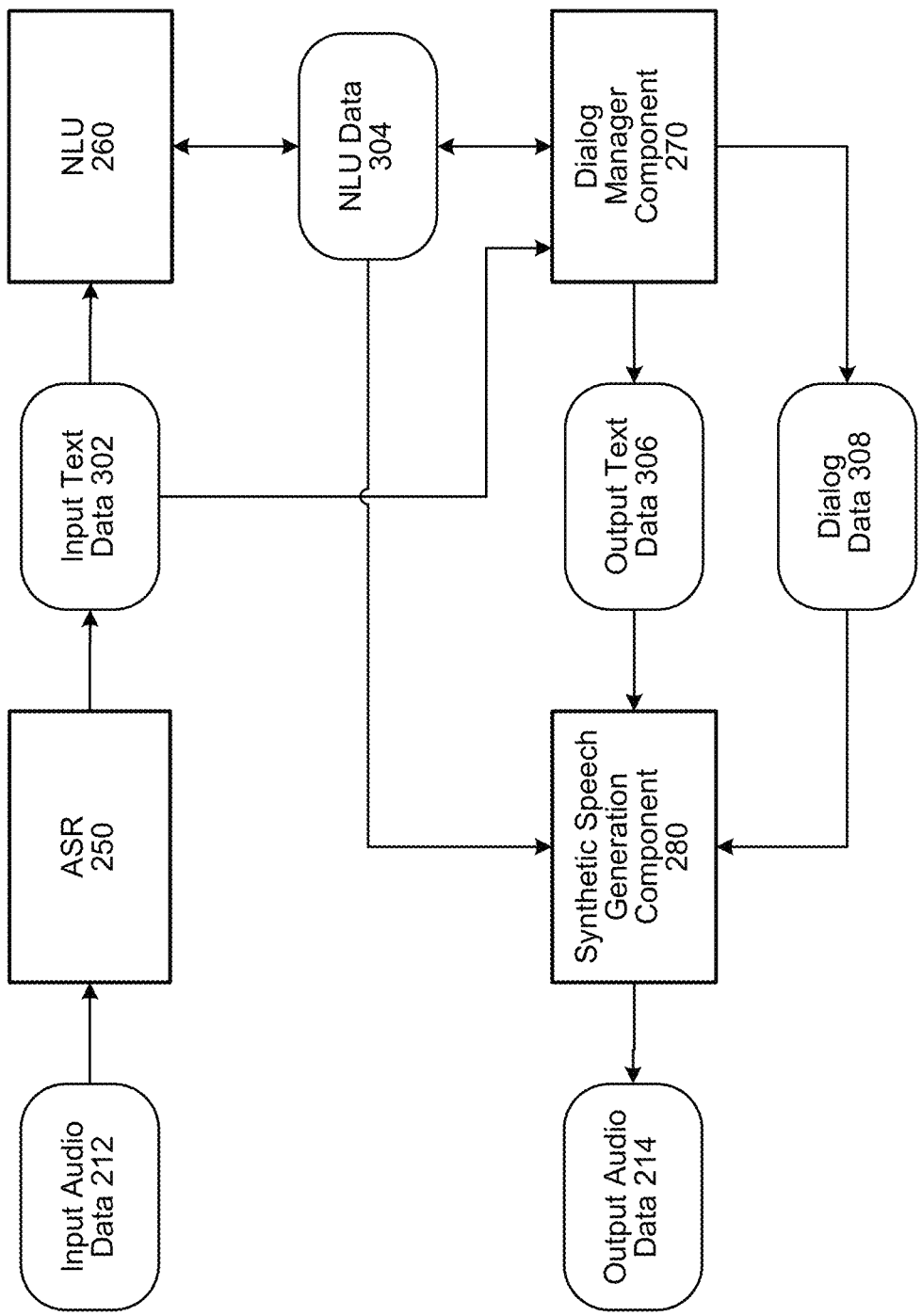

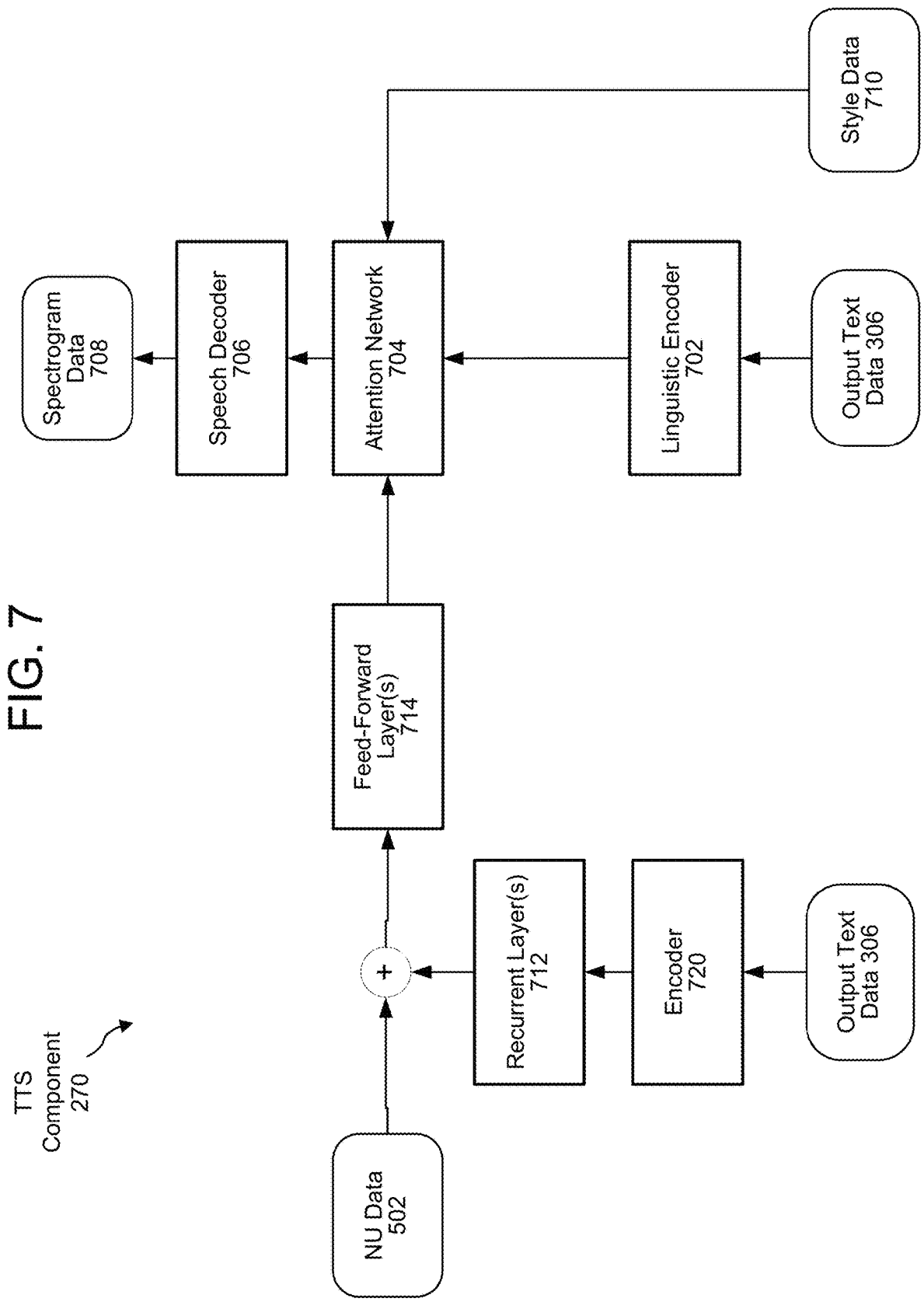

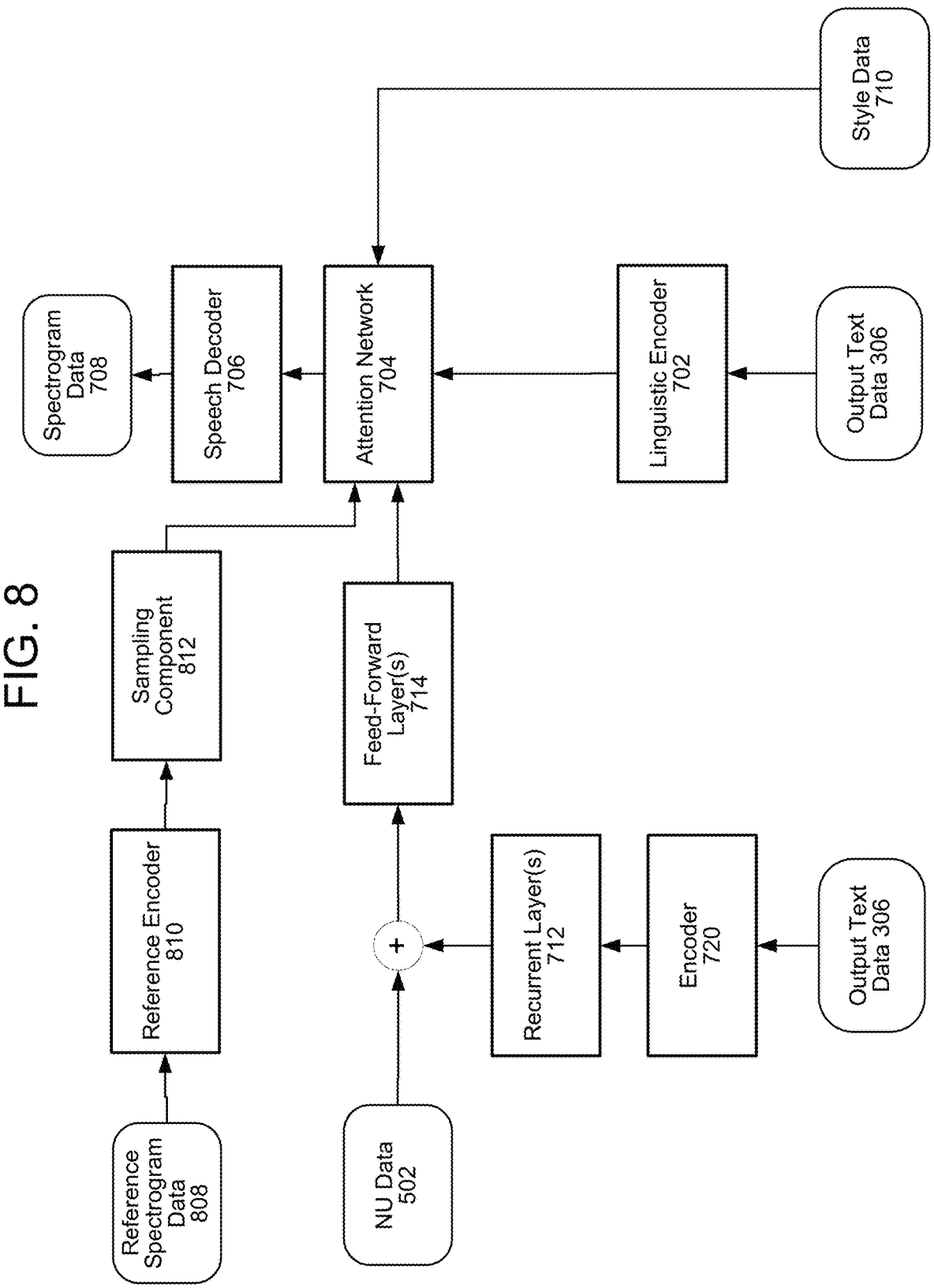

SYNTHETIC SPEECH PROCESSING

BACKGROUND

A speech-processing system may include a dialog manager that processes input data corresponding to a command from a user and determines output data corresponding to a response to the command. The command may first be represented by audio data; an automatic speech-recognition component may process the audio data to determine corresponding text data, and a natural-language understanding component may process the text data to determine one or more of a domain of the command, an intent corresponding to the command, and/or an entity corresponding to the command. The speech-processing system may further include a text-to-speech component for generating audio representing the response to the command.

BRIEF DESCRIPTION OF DRAWINGS

For a more complete understanding of the present disclosure, reference is now made to the following description taken in conjunction with the accompanying drawings.

FIG. 1 illustrates a method for speech processing according to embodiments of the present disclosure.

FIG. 2B illustrates components of a user device for speech processing according to embodiments of the present disclosure.

FIGS. 3A and 3B illustrate components for generating output data given input data according to embodiments of the present disclosure.

FIG. 7 illustrates components for varying vocal characteristics of output audio data according to embodiments of the present disclosure.

FIG. 8 illustrates components for training a TTS system according to embodiments of the present disclosure.

DETAILED DESCRIPTION

Figure 2A:
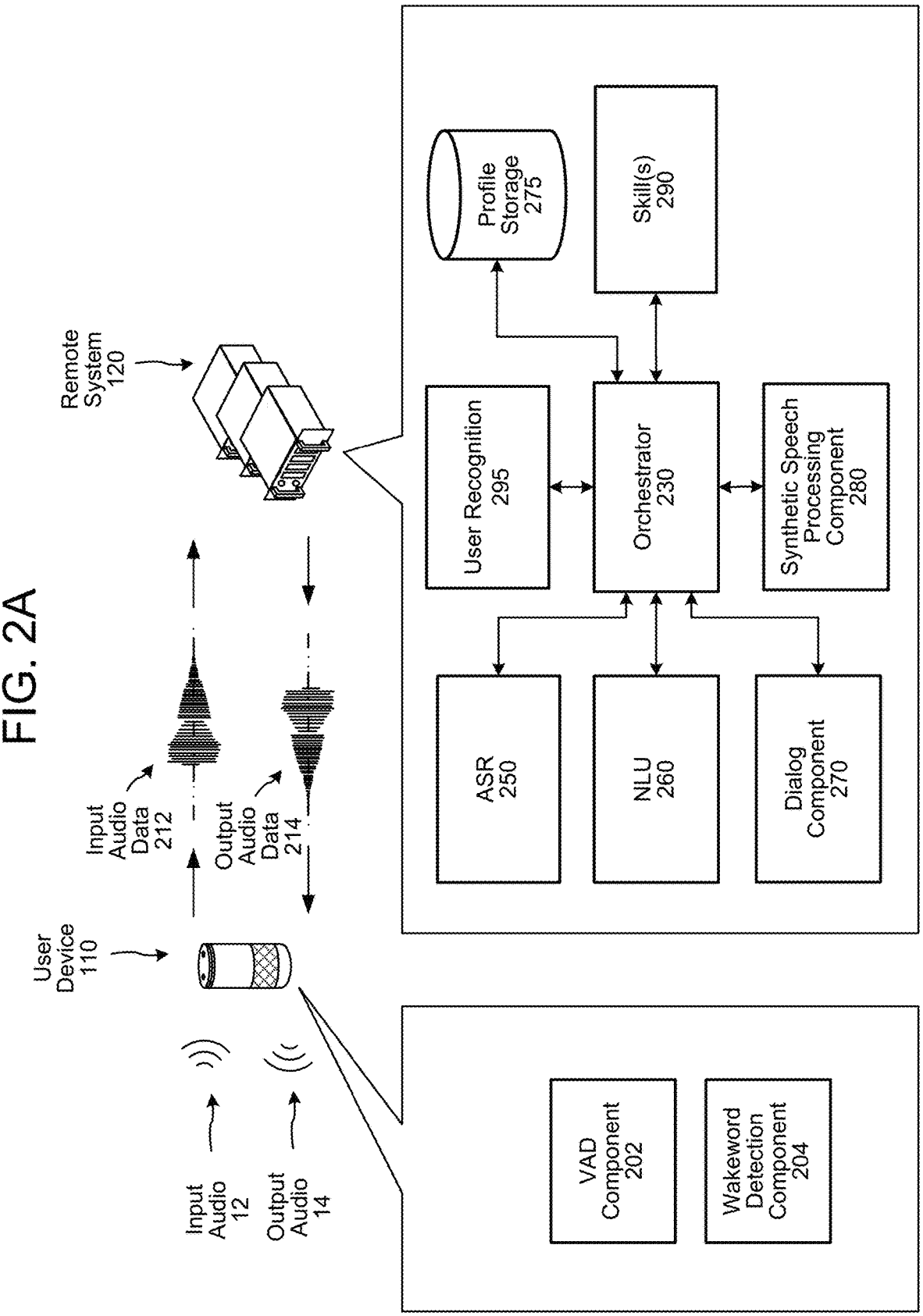
FIG. 2A illustrates components of a user device and of a remote system for speech processing according to embodiments of the present disclosure.

A speech-processing system may include a number of components, each of which may be trained neural-network models, for performing various functions associated with speech processing. Together, these components may enable the speech-processing system to receive, interpret, and respond to commands from a user. An automatic speech-recognition (ASR) component, which may be or include one or more first trained model(s), may process audio data (and/or other input data) corresponding to a command and determine corresponding output data, which may be text data, audio data, and/or video data. A natural-language understanding (NLU) component, which may be or include one or more second trained model(s), may process the output data to determine a domain, intent, and/or slot corresponding to the command. A dialog manager component, which may be or include one or more third trained model(s), may process the output data and/or output of the NLU component to determine output data corresponding to a response to the command. Finally, a text-to-speech (TTS) component, which may be or include one or more fourth trained models, may process the output data to determine corresponding audio data. In some embodiments, two or more of the ASR, NLU, dialog manager, and/or TTS components may be combined into a single model.

The TTS component may vary aspects of the determined audio data based on the output of the NLU component and/or dialog manager component. These varied aspects may include variation in phrasing of words represented in the audio data and/or variation in vocal characteristics, such as tone, speech rate, emphasis, and/or accent, etc., of words represented in the audio data. These vocal characteristics may also be known as prosody. Variation of the phrasing of the words and/or variation in the vocal characteristics may lead to an improved user experience because said variations may better approximate human speech. For example, if a human is asked the same question more than once, the response to the question may vary. If, for example, the question is "What time is it," one response may be "it's 12 PM," but another response may be "it's noon." A human may similarly vary vocal characteristics of speech in different contexts or to emphasize particular words. For example, a response may have a neutral tone when reporting the weather but an excited tone when reporting an unexpected event. Similarly, certain words in a response, such as the name of a famous band, may have more emphasis than others, such as in the response, "TOTO is playing next week!"

The present disclosure thus relates to systems and methods for generating synthesized speech, given input text data and natural-understanding (NU) data, such that the synthesized speech includes variations that are based at least in part on the natural-understanding data. These variations in the synthesized speech may thus better approximate the variations that occur naturally in human speech. In various embodiments, a linguistic encoder processes input text data to determine first encoded data representing an input such as an utterance. A second encoder may be trained to also process the input text data and determine second encoded data representing natural-understanding information related to the utterance. This natural-understanding information may also be referred to as the context of the utterance. This second encoded data may be combined with NLU embedding data, which represents encoded information determined by an NLU component processing the input text data. The second encoded data may be combined with the NLU embedding data and then used to condition an attention network. The attention network may then process the first encoded data determined by the linguistic encoder to determined weighted encoded data, which in turn may be processed by a speech decoder to determine audio data, such as spectrogram data. For example, if the NLU embedding data indicates that an entity is represented in the input text data, the attention network may weight the output of the linguistic encoder such that the audio data includes a representation of the entity that is emphasized.

Referring to FIG. 1, a user 10 utters speech that is represented by input audio 12. A user device 110 receives the input audio 12 and transduces it (using, e.g., a microphone) into corresponding audio data. As explained in further detail below, the user device 110 may perform additional speech processing and/or may send the audio data to a remote system 120 for further audio processing via a network 199. Regardless of whether it is performed by the user device 110 and/or the remote system 120, an ASR component may process the audio data to determine corresponding text data, and an NLU component may process the text data to determine NLU data such as a domain, intent, and/or entity associated with the text data.

The user device 110 and/or remote system 120 may then process (130) the input data, such as input text data, using a linguistic encoder, such as the linguistic encoder 702 illustrated in FIG. 7. As explained in greater detail with reference to that figure, the linguistic encoder 702 may be one or more neural network(s) such as a feed-forward neural network (FFNN) and/or a recurrent neural network. The linguistic encoder 702 may thus include one or more nodes connected to one or more other nodes; the nodes may be arranged in layers such that the output of one layer is processed by a second layer. The nodes may each be associated with a weight that multiplies an input by a first value and/or an offset that adds an input by a second value. The output of the linguistic encoder 702 may be first encoded data consisting of a first vector of a number of encoded values; the first vector may uniquely identify the words of the input text data as a single set of values.

The user device 110 and/or remote system 120 may then process (132) the input text data using a second encoder, such as the encoder 720 of FIG. 7. Like the linguistic encoder 702, the second encoder 720 may determine second encoded data consisting of a second vector of values. Unlike the output of the linguistic encoder 720, however, this second vector may define variations in synthetic speech corresponding to the natural-understanding data, such as which words should be emphasized.

The user device 110 and/or remote system 120 may then process (134) the first encoded data using the second encoded data and natural-understanding data (as determined by the NLU component). For example, an attention network, such as the attention network 704 of FIG. 7, may determine one or more weights of one or modes based at least in part on the second encoded data and/or natural-understanding data to determine third encoded data by processing the first encoded data using the one or more weights. As explained in greater detail below, the attention network 704 may be a neural network of nodes arranged in one or more layers; each node of the attention network 704 may be connected to not just the output layer of the linguistic encoder 702, but to one or more nodes in one or more other layers of the linguistic encoder 702. Each connection between the attention network 704 and the linguistic encoder 702 may be associated with a weight. By changing at least some of the weights of the attention network 704 in accordance with the first encoded data, the second encoded data, and the natural-understanding data, the attention network 704 causes the variations in the synthetic speech represented in the output audio to vary in accordance with the natural-understanding data.

The user device 110 and/or remote system 120 may then process (136) the third encoded data to determine audio data representing synthesized speech corresponding to a response to the command. The decoder may be, for example, the decoder 706 of FIG. 7, and like the encoder 702, may be a neural network such as a FFNN or RNN. The audio data may be a digital representation of an audio waveform, a spectrogram such as a Mel-spectrogram, or any other such form of audio data. If the audio data is a spectrogram, it may be further processed by another component, such as a vocoder, to transform the spectrogram into a corresponding audio waveform. Data corresponding to the audio waveform may be determined by, or may be sent to, the user device 110 to be output as output audio 14.

Referring to FIG. 2A, the speech-processing system may distributed across one or more user devices 110 and one or more remote systems 120, such as a server or local hub. The user device 110 may capture audio that includes speech and then either process the audio itself and/or transmit audio data representing the audio to the remote system for further processing. The remote system 120 may have access to greater computing resources, such as more and/or faster computer processors, than does the user device, and may thus be able to process the audio data and determine an appropriate response faster than the user device. The user device may have, for example, a wakeword-determination component that detects presence of a wakeword in audio and transmits corresponding audio data to the remote system only when the wakeword is detected. As used herein, a "wakeword" is one or more particular words, such as "Alexa," that a user of the user device may utter to cause the user device to begin processing the audio data, which may further include a representation of a command, such as "turn on the lights."

Referring also to FIG. 2B, the speech-processing system may disposed wholly on the user device 110. In other embodiments, some additional components, such as an ASR component, are disposed on the user device 110, while other components, such as the speech-generation component 280, are disposed on the remote system 120. Any distribution of the components of the speech-processing system of the present disclosure is, thus, within its scope. The below discussion thus pertains to both the distribution of components of FIGS. 2A and 2B and also to similar distributions.

The user device 110 and/or remote system 120 may thus include an automatic speech-recognition (ASR) component that processes the audio data to determine corresponding text data and a natural-language understanding (NLU) component that processes the text data to determine the intent of the user expressed in the text data and thereby determine an appropriate response to the intent. The remote system 120 may determine and transmit data representing the response to the user device 110 (or other device), which may then output the response. In other embodiments, a user of the user device 110 may wish to transmit audio data for reasons other than ASR/NLU processing, such as one- or two-way audio communication with one or more other parties or remote systems.

Before processing the audio data, the device 110 may use various techniques to first determine whether the audio data includes a representation of an utterance of the user 10. For example, the user device 110 may use a voice-activity detection (VAD) component 202 to determine whether speech is represented in the audio data based on various quantitative aspects of the audio data, such as the spectral slope between one or more frames of the audio data, the energy levels of the audio data in one or more spectral bands the signal-to-noise ratios of the audio data in one or more spectral bands and/or other quantitative aspects. In other examples, the VAD component 202 may be a trained classifier configured to distinguish speech from background noise. The classifier may be a linear classifier, support vector machine, and/or decision tree. In still other examples, hidden Markov model (HMM) and/or Gaussian mixture model (GMM) techniques may be applied to compare the audio data to one or more acoustic models in speech storage; the acoustic models may include models corresponding to speech, noise (e.g., environmental noise and/or background noise), and/or silence.

The user device 110 may instead or in addition determine that the audio data represents an utterance by using a wakeword-detection component 204. If the VAD component 202 is being used and it determines the audio data includes speech, the wakeword-detection component 204 may only then activate to process the audio data to determine if a wakeword is likely represented therein. In other embodiments, the wakeword-detection component 204 may continually process the audio data (in, e.g., a system that does not include a VAD component 202.) The user device 110 may further include an ASR component for determining text data corresponding to speech represented in the input audio 12 and may send this text data to the remote system 120.

The trained model(s) of the VAD component 202 and/or wakeword-detection component 204 may be CNNs, RNNs, acoustic models, hidden Markov models (HMMs), and/or classifiers. These trained models may apply general large-vocabulary continuous speech recognition (LVCSR) systems to decode the audio signals, with wakeword searching conducted in the resulting lattices and/or confusion networks. Another approach for wakeword detection builds HMMs for each key wakeword word and non-wakeword speech signals respectively. The non-wakeword speech includes other spoken words, background noise, etc. There may be one or more HMMs built to model the non-wakeword speech characteristics, which may be referred to as filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component 204 may use convolutional neural network (CNN)/recursive neural network (RNN) structures directly, without using a HMM. The wakeword-detection component 204 may estimate the posteriors of wakewords with context information, either by stacking frames within a context window for a DNN, or using a RNN. Follow-on posterior threshold tuning and/or smoothing may be applied for decision making. Other techniques for wakeword detection may also be used.

The remote system 120 may be used for additional audio processing after the user device 110 detects the wakeword and/or speech, potentially begins processing the audio data with ASR and/or NLU, and/or sends corresponding audio data 212. The remote system 120 may, in some circumstances, receive the audio data 212 from the user device 110 (and/or other devices or systems) and perform speech processing thereon. Each of the components illustrated in FIG. 2 may thus be disposed on either the user device 110 or the remote system 120. The remote system 120 may be disposed in a location different from that of the user device 110 (e.g., a cloud server) and/or may be disposed in the same location as the user device 110 (e.g., a local hub server).

The audio data 212 may be sent to, for example, an orchestrator component 230 of the remote system 120. The orchestrator component 230 may include memory and logic that enables the orchestrator component 230 to transmit various pieces and forms of data to various components of the system 120. An ASR component 250, for example, may first transcribe the audio data into text data representing one more hypotheses corresponding to speech represented in the audio data 212. The ASR component 250 may transcribe the utterance in the audio data based on a similarity between the utterance and pre-established language models. For example, the ASR component 250 may compare the audio data with models for sounds (which may include, e.g., subword units, such as phonemes) and sequences of sounds represented in the audio data to identify words that match the sequence of sounds spoken in the utterance. These models may include, for example, one or more finite state transducers (FSTs). An FST may include a number of nodes connected by paths. The ASR component 250 may select a first node of the FST based on a similarity between it and a first subword unit of the audio data. The ASR component 250 may thereafter transition to second and subsequent nodes of the FST based on a similarity between subsequent subword units and based on a likelihood that a second subword unit follows a first.

After determining the text data, the ASR component 250 may send (either directly and/or via the orchestrator component 230) the text data to a corresponding NLU component 260. The text data output by the ASR component 460 may include a top-scoring hypothesis and/or may include an N-best list including multiple hypotheses (e.g., a list of ranked possible interpretations of text data that represents the audio data). The N-best list may additionally include a score associated with each hypothesis represented therein. Each score may indicate a confidence of ASR processing performed to generate the hypothesis with which it is associated.

The NLU component 260 may process the text data to determine a semantic interpretation of the words represented in the text data. That is, the NLU component 260 determines one or more meanings associated with the words represented in the text data based on individual words represented in the text data. The meanings may include a domain, an intent, and one or more entities. As those terms are used herein, a domain represents a general category associated with the command, such as "music" or "weather." An intent represents a type of the command, such as "play a song" or "tell me the forecast for tomorrow." An entity represents a specific person, place, or thing associated with the command, such as "Toto" or "Boston." The present disclosure is not, however, limited to only these categories associated with the meanings (referred to generally herein as "natural-understanding data," which may include data determined by the NLU component 260 and/or the dialog manager component.)

The NLU component 260 may determine an intent (e.g., an action that the user desires the user device 110 and/or remote system 120 to perform) represented by the text data and/or pertinent pieces of information in the text data that allow a device (e.g., the device 110, the system 120, etc.) to execute the intent. For example, if the text data corresponds to "play Africa by Toto," the NLU component 260 may determine a user intended the system to output the song Africa performed by the band Toto, which the NLU component 260 determines is represented by a "play music" intent. The NLU component 260 may further process the speaker identifier 214 to determine the intent and/or output. For example, if the text data corresponds to "play my favorite Toto song," and if the identifier corresponds to "Speaker A," the NLU component may determine that the favorite Toto song of Speaker A is "Africa."

The orchestrator component 230 may send NLU data to the dialog component 270; in some embodiments, the dialog component 270 is a speechlet component 290. The dialog component 270 determines output text data using the NLU data. The system may include more than one dialog component 270; each dialog component 270 may be associated with one or more different domains, intents, and/or entities. For example, if the NLU data includes intent data corresponding to the "play music" intent and entity data corresponding to "artist: Toto," the orchestrator 230 may send the NLU data to a music-related dialog component 270, which may determine a response that includes Toto music audio data for output by the user device 110.

The dialog component 270 may be a trained model that processes the NLU data (and, in some embodiments, the input text data) and determines output text data representing a response to the command represented in the input text data. The trained model of the dialog component 270 may be, in some embodiments, a sequence-to-sequence ("seq2seq") model that includes an encoder and a decoder (in addition to other possible components, such as an attention network). The encoder may process the input text data and/or NLU data word-by-word to determine a vector that represents the entire input text data and/or NLU data. The encoder may include one or more nodes having recurrent connections (as described here); these nodes may be, for example, long short-term memory (LSTM) nodes. The encoder may further process the text data and/or NLU data in both a first direction (e.g., from beginning to end) and in a second direction (e.g., from end to beginning); such an encoder may be referred to as a bi-directional encoder. The decoder may then process the vector determined by the encoder (and/or, in some embodiments, one or more outputs of an attention network) to determine a response to the input text data. The response may be a series of words represented by output text data. The dialog component 270 may be trained using training data; this training data may be, for example, text data representing a collection of commands and corresponding responses.

A speechlet 290 may be software such as an application. That is, the speechlet 290 may enable the device 110 and/or system 120 to execute specific functionality in order to provide data and/or produce some other output requested by the user 10. The device 110 and/or system 120 may be configured with more than one speechlet 290. For example, a weather speechlet 290 may enable the device 110 and/or system 120 to provide weather information, a ride-sharing speechlet may enable the device 110 and/or system 120 to book a trip with respect to a taxi and/or ride sharing service, and a food-order speechlet may enable the device 110 and/or system 120 to order a pizza with respect to a restaurant's online ordering system.

In some instances, the speechlet 290 may provide output text data responsive to received NLU results data. The device 110 and/or system 120 may include a synthetic speech-generation component 280 that generates output audio data from input text data and/or input audio data. The synthetic speech-generation component 280 may use one of a variety of speech-synthesis techniques. In one method of synthesis called unit selection, the synthetic speech-generation component 280 analyzes text data against a database of recorded speech. The synthetic speech-generation component 280 may thus select units of recorded speech matching the text data and concatenates the units together to form output audio data. In another method of synthesis called parametric synthesis, the synthetic speech-generation component 280 varies parameters such as frequency, volume, and noise to create output audio data including an artificial speech waveform. Parametric synthesis uses a computerized voice generator, sometimes called a vocoder. In another method of speech synthesis, a trained model, which may be a sequence-to-sequence model, directly generates output audio data based on the input text data.

The device 110 and/or system 120 may include a speaker-recognition component 295. The speaker-recognition component 295 may determine scores indicating whether the audio data 212 originated from a particular user or speaker. For example, a first score may indicate a likelihood that the audio data 212 is associated with a first synthesized voice and a second score may indicate a likelihood that the speech is associated with a second synthesized voice. The speaker recognition component 295 may also determine an overall confidence regarding the accuracy of speaker recognition operations. The speaker recognition component 295 may perform speaker recognition by comparing the audio data 212 to stored audio characteristics of other synthesized speech. Output of the speaker-recognition component 295 may be used to inform NLU processing as well as processing performed by the speechlet 290.

The system 120 may include a profile storage 275. The profile storage 275 may include a variety of information related to individual users and/or groups of users that interact with the device 110. The profile storage 275 may similarly include information related to individual speakers and/or groups of speakers that are not necessarily associated with a user account. The profile storage 275 of the user device 110 may include user information, while the profile storage 275 of the remote system 120 may include speaker information.

The profile storage 275 may include one or more profiles. Each profile may be associated with a different user and/or speaker. A profile may be specific to one user or speaker and/or a group of users or speakers. For example, a profile may be a "household" profile that encompasses profiles associated with multiple users or speakers of a single household. A profile may include preferences shared by all the profiles encompassed thereby. Each profile encompassed under a single profile may include preferences specific to the user or speaker associated therewith. That is, each profile may include preferences unique from one or more user profiles encompassed by the same user profile. A profile may be a stand-alone profile and/or may be encompassed under another user profile. As illustrated, the profile storage 275 is implemented as part of the remote system 120. The profile storage 275 may, however, may be disposed on the user device 110 and/or in a different system in communication with the user device 110 and/or system 120, for example over the network 199. The profile data may be used to inform NLU processing, dialog manager processing, and/or speech processing.

Each profile may include information indicating various devices, output capabilities of each of the various devices, and/or a location of each of the various devices 110. This device-profile data represents a profile specific to a device. For example, device-profile data may represent various profiles that are associated with the device 110, speech processing that was performed with respect to audio data received from the device 110, instances when the device 110 detected a wakeword, etc. In contrast, user- or speaker-profile data represents a profile specific to a user or speaker.

Figure 3B:
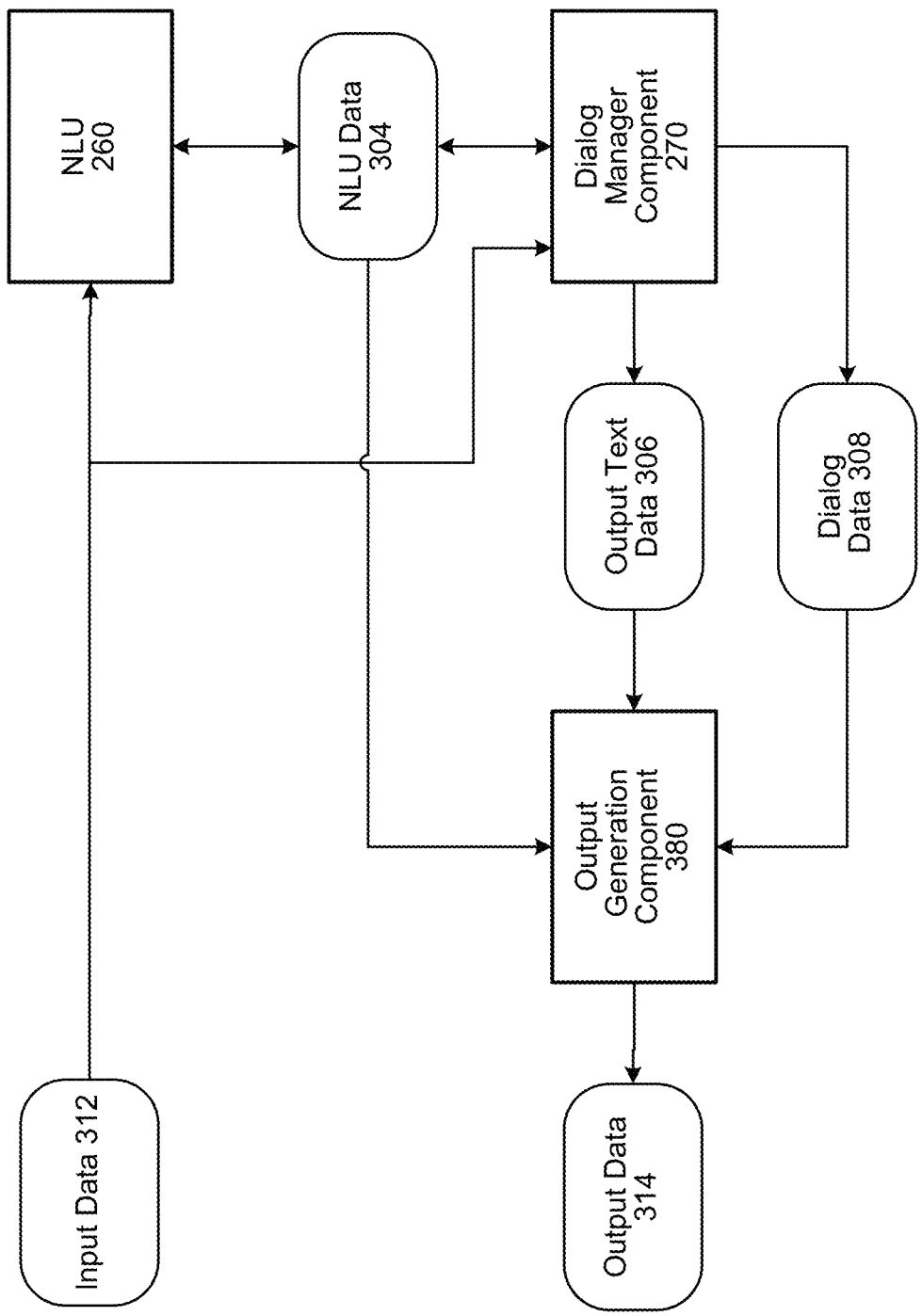

FIGS. 3A and 3B illustrate components of a system for generating output audio given input data according to embodiments of the present disclosure. Referring first to FIG. 3A, as described above, the system may introduce variations in the output audio data 214, which may include variations in phrasing of words and/or variations in vocal characteristics, to better approximate human speech. The ASR component 250, as described above, processes input audio data 212 to determine input text data 302. As also described above, the input text data 302 may be data that represents words corresponding to the input audio data 212 and/or may be an N-best list of possible words that correspond to the input audio data 212. The input text data 302 may instead or in addition include sub-word units, such as phonemes, corresponding to the input audio data 212.

Though FIG. 3A represents receipt of one item of input audio data 212 and generation of one item of output audio data 214 (e.g., one "turn" of dialog), further items of input data may be received, and further items of output data may be generated, during interactions with the user 10 that involve multiple turns of dialog ("multi-turn" dialog). The synthetic speech-generation component 280 may thus use data from previous turns of dialog, in addition to the NLU data 304 and/or dialog data 308, when generating the output audio data 214. In some embodiments, the dialog data 308 includes this information regarding prior turns of dialog. For example, if the input audio data 212 indicates that the user 10 didn't hear or understand a word represented in a prior output audio data 214, the synthetic speech-generation component 280 may generate additional output audio data 214 that includes a representation of the word spoken more loudly or more slowly.

Referring to FIG. 3B, in other embodiments of the present disclosure, other input data 312 than the input audio data 212 may be processed. The input data 312 may be, for example, text data; a user 10 of the user device 110 may enter the text data using an input device of the user device 110, such as a touchscreen and/or keyboard. The input data 312 may instead or in addition be video data; the video data may include, for example, a representation of lips of a user as they speak, a representation of gestures of a user, such as sign language, or other such data. The present disclosure is not limited to any type of input data 312.

If the input data 312 includes text data, the NLU component 260 may process the input data 312 without further processing. If the input data 312 includes other types of data, such as video data, a video-processing component, such as an image-recognition component, may process the input data 312 to determine corresponding text data, which may in turn be processed by the NLU component 260.

Similar to how the input data 312 is not limited to only audio data, the output data 314 is also not limited to only audio data or to only one type of data. The output data may be, for example, text data; this text data may be a rephrased version of the output text data 306, as described herein. The output generation component 380 may further process the output text data 306 to determine video data as the output data 314. The output data 314 may further be or include other data, such as video data; this video data may include, for example, a visage capable of representing different facial expressions. The output data 314 may be a combination of types of data, such as video of a visage moving its lips and corresponding audio data of a representation of speech.

Returning to FIG. 3A, the NLU component 260 determines NLU data 304, which, as described above, may include a domain, intent, and/or entity corresponding to the input text data 302. The dialog manager component 270, as also described above, processes the input text data 302 and/or NLU data 304 to determine output text data 306 representing a response to a command corresponding to the input text data 312. The dialog manager component 270 may further determine dialog data 308, which, like the NLU data 304, may include a domain, intent, and/or entity different from that of the NLU data 304. For example, the output text data 306 may reference a new entity that does not appear in the NLU data 304 and/or may change the domain determined by the NLU component 260.

As explained in greater detail below, a synthetic speech-generation component 280 processes the output text data 306, the NLU data 304, and/or the dialog data 308 to determine output audio data 214. As described herein, the output audio data 214 may include different words or phrasings of words as compared to the output text data 306 and/or may represent variations in vocal characteristics based at least in part on the NLU data 304 and/or the dialog data 308.

Figure 4:
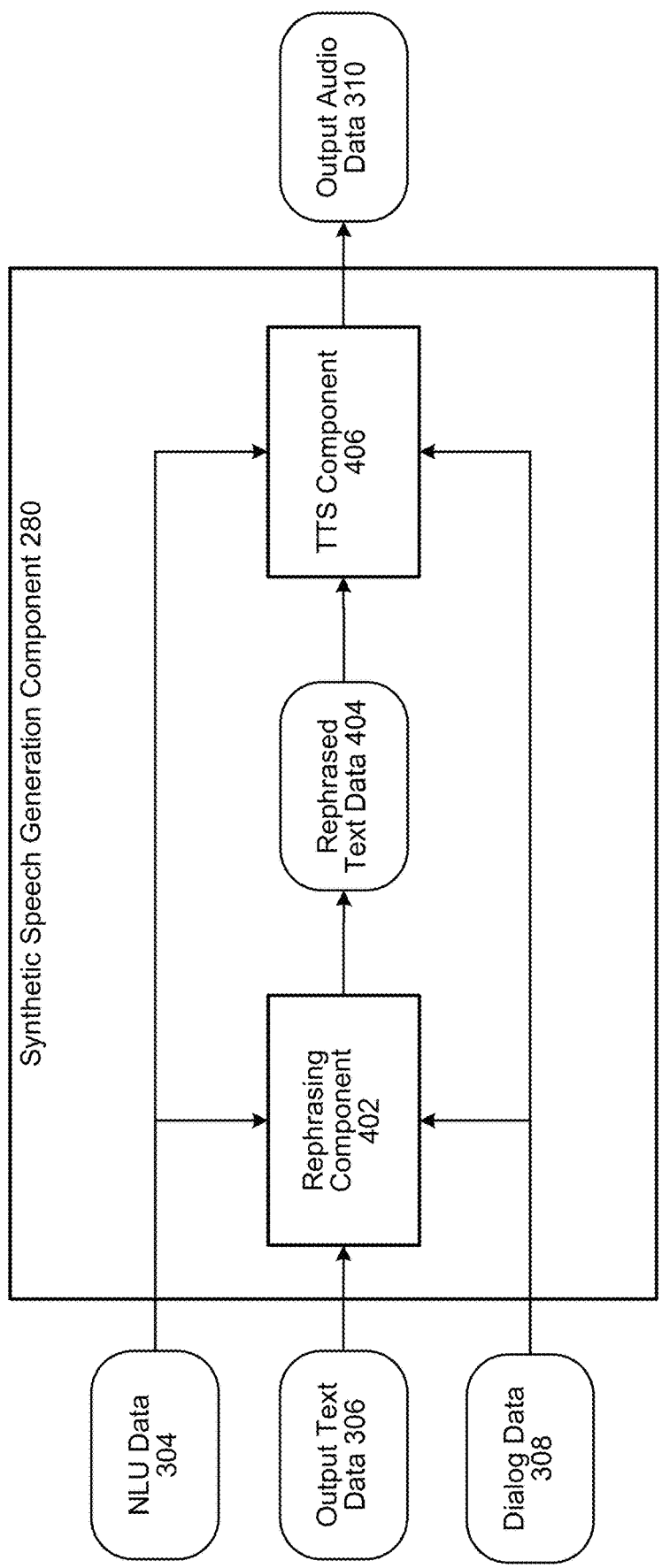
FIG. 4 illustrates components for rephrasing input text and/or varying vocal characteristics of output audio according to embodiments of the present disclosure.

FIG. 4 illustrates components of a system for rephrasing input text and/or varying vocal characteristics of output audio according to embodiments of the present disclosure. The synthetic speech-generation component 280 may include a rephrasing component 402 (described in greater detail with reference to FIG. 6) and/or a TTS component 406 (described in greater detail with reference to FIG. 7). In some embodiments, the synthetic speech-generation component 280 includes only the TTS component 406 and does not perform rephrasing. In other embodiments, the rephrasing component 402 generates the rephrased text data 404, but the TTS component 406 does not introduce variations in vocal characteristics in the output audio data 214.

In some embodiments, the rephrasing component 402 and the TTS component 406 may communicate to determine whether the output audio data 214 should include one or more variations due to rephrasing, one or more variations due to changes in vocal characteristics, or both. The synthetic speech-generation component 280 may, for example, determine a score for each type of variation corresponding to a degree of variation. The score for the rephrasing may, for example, be determined by the number of words different in the output text data 306 as compared to the rephrased text data 404. The score for variations in vocal characteristics may be determined by determining a maximum loudness of the output audio data 310, a maximum or minimum speech rate of the output audio data 310, or by measuring other such properties of the output audio data 310. If either score is above a respective threshold, or if the sum of the scores is above another threshold, the synthetic speech-generation component 280 may determine to include only variations from rephrasing in the output audio data 310 or only variations of vocal characteristics in the output audio data 310. The synthetic speech-generation component 280 may instead or in addition cause either of the rephrasing component 402 and/or the TTS component 406 to reduce their respective determined variations.

Figure 5:
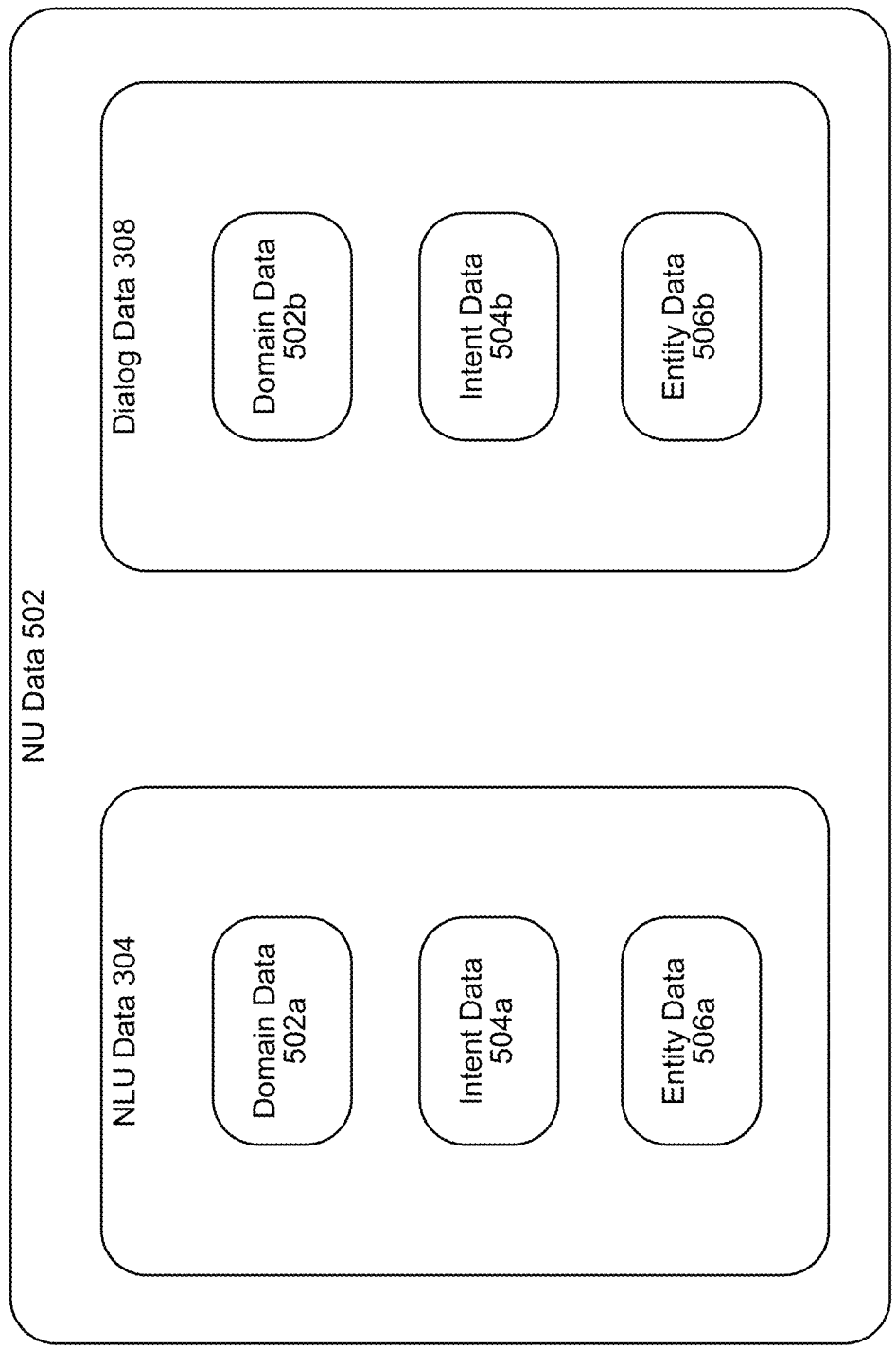
FIG. 5 illustrates examples of NLU and dialog data according to embodiments of the present disclosure.

FIG. 5 illustrates examples of NLU and dialog data according to embodiments of the present disclosure. NU data 502 may include the NLU data 302 and/or the dialog data 308. As described herein, the NLU data 302 may include domain data 502a, which may include representations of one or more domains, intent data 504a, which may include representations of one or more intents, and/or entity data 506a, which may include representations of one or more entities. The dialog data 308 may include domain data 502b, which may include representations of one or more domains, intent data 504b, which may include representations of one or more intents, and/or entity data 506b, which may include representations of one or more entities. For example, if the input audio data 212 includes a representation of the phrase, "Alexa, play Africa by Toto," the NLU component 260 may determine that the domain data 502*a* corresponds to "music," that the intent data 504*b* corresponds to "play:music," and that the entity data 506*a* corresponds to "band:Toto" and "song:Africa." If the dialog manager component 270 determines that the output text data 306 includes a representation of the phrase, "Got it. Would you also like to listen to 'Rosanna'?," the dialog manager component 270 may further determine that the entity data 506*b* corresponds to "band:Toto" and "song:Rosanna." The dialog data 308 may further include some or all of the NLU data 304; in these embodiments, the rephrasing component 402 and/or TTS component 406 may process the text data 306/404 and the dialog data 308 but not the NLU data 304. The NU data 502 may further include additional data, such as data representing an emotional state of a user.

Figure 6:
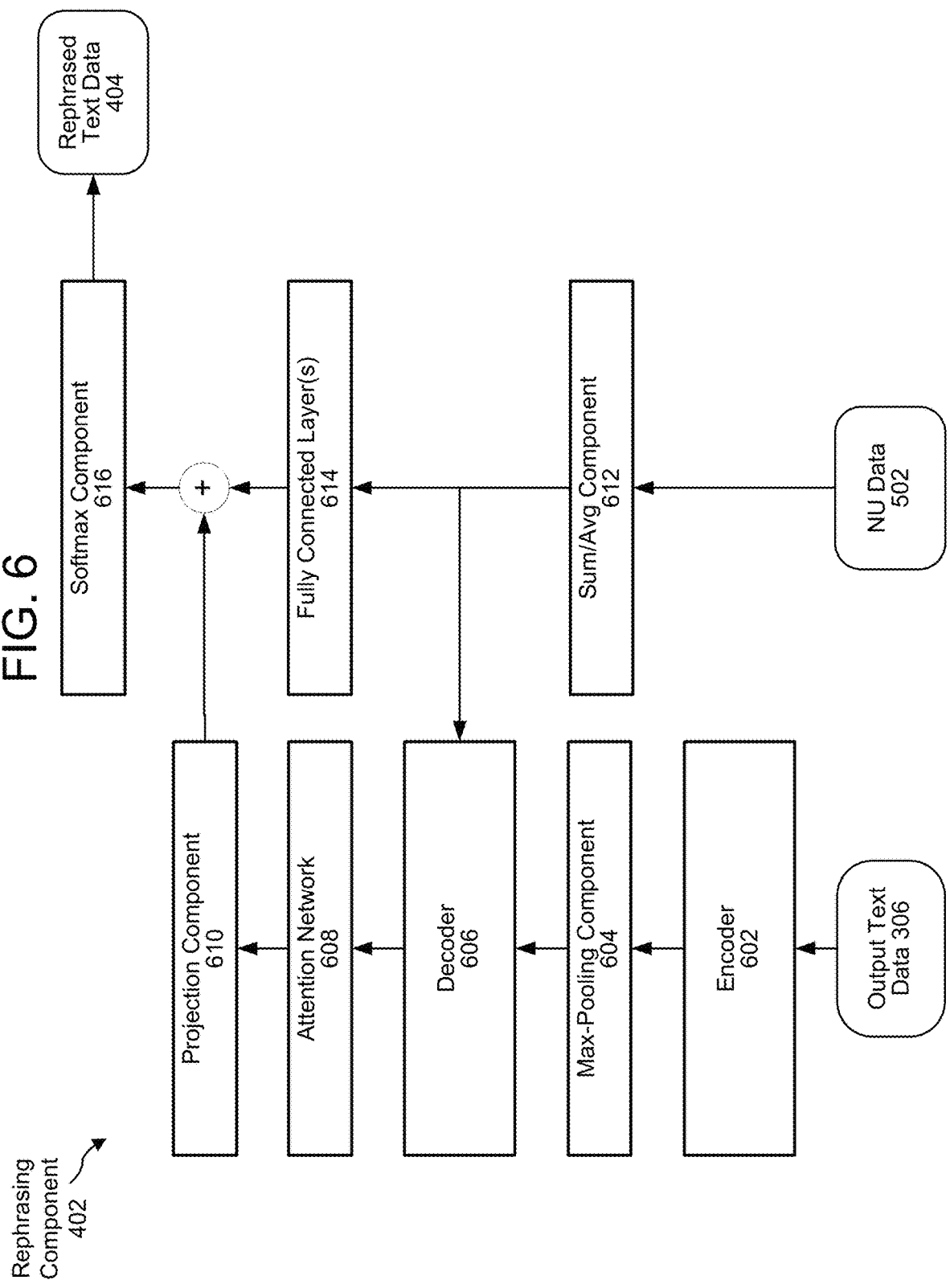
FIG. 6 illustrates components of for rephrasing text data according to embodiments of the present disclosure.

FIG. 6 illustrates components of the rephrasing component 402 for rephrasing text data according to embodiments of the present disclosure. The rephrasing component 402 may include a seq2seq model that includes an encoder 602 and a decoder 606. One particular implementation of the rephrasing component 402 is illustrated; the present disclosure is not, however, limited to only this implementation.

The encoder 602 processes the output text data 306 (that is output by the dialog manager component 270) to determine encoded data. Like the other encoders discussed herein, the encoder 602 may be a trained neural-network model consisting of one or more nodes arranged in one or more layers.

The encoded data may in turn be processed by a max-pooling component 604. The max-pooling component 604 may be a mathematical function that reduces the size of one or more dimensions of the encoded data output by the encoder 602. The max-pooling component 604 may divide each dimension into a number of regions and, for each region, find the maximum value of all the values of that region. The max-pooling component 604 may then output these maximum values and their corresponding regions.

The decoder 606 receives the output of the max-pooling component 604 as input. The decoder 606, like, the encoder 602, may be a trained neural-network model consisting of one or more nodes arranged in one or more layers, as described with the other decoders described herein.

The decoder 606 may be autoregressive, meaning that every output it generates is fed back as its input until the generation of a special "end of sentence" output marks the end of the sentence represented by the rephrased text data 404. To condition the rephrasing component 402 on the desired attributes that the decoded sentence should have, the decoder 606 may also receive, as input, NU data 502, which may be an encoded version of the NU data 502 as determined by, for example, an encoder. A summation and/or averaging component 612 may first process the NU data 502 by summing some or all of its values (or groups of values) and/or averaging some or all of its values (or groups of values). In some embodiments, values corresponding to one or more intents 504*a*, 504*b* and values corresponding to one or more entities 506*a*, 506*b* are summed or averaged. The decoder 606 may process the output of the sum/average component 612 as a first step before processing the output of the encoder 602 and max-pooling component 604.

The output of the decoder 606 may be processed by an attention network 608. The attention network 608 may be a RNN, DNN, and/or other network discussed herein, and may include nodes having weights and/or cost functions arranged into one or more layers. Attention probabilities may be computed after projecting inputs to (e.g.) 128-dimensional hidden representations. In some embodiments, the attention network 608 weights certain values of the outputs of the decoder 606 before sending them to a projection component 610. The attention network 608 may, for example, weight certain portions of the context vector by increasing their value and may weight other portions of the context vector by decreasing their value. The increased values may correspond to values to which more attention should be paid by the projection component 610 and the decreased values may correspond to values feature to which less attention should be paid by the projection component 610. The attention network 608 may thus allow the projection component 610 to "attend" to different parts of the output of the decoder 606 at each step of output generation. The attention network 608 may thus allow the decoder 606 and/or linear projection component 610 to learn what to attend to.

The linear projection component 610 may perform a projection on the output of the attention network 608. The projection may be a linear transformation P from a vector space to itself such that $P^2=P$. The output of the linear projection component 610 may be combined with the output of one or more fully connected layers 614; this combination may be processed using a softmax component 616 to determine the rephrased text data 404. The softmax component 616 may perform a normalization function that adjusts its input such, that, while each value in the output retains the same proportionality with respect to corresponding values of its input, all of the values of the output lie between two values, such as 0 and 1, and the sum of all the output values the large of the two ranges, such as 1. The fully connected layers 614 may determine its output by processing the output of the sum/average component 612.

FIG. 7 illustrates components of a system for varying vocal characteristics of output audio data according to embodiments of the present disclosure. A linguistic encoder 702 processes the output text data 306, an attention network 704 determines weighted encoded data by processing the output of the encoder 702; and a speech decoder 706 determines audio data, such as spectrogram data 708, by processing the output of the linguistic encoder 702. These components are described in greater detail with reference to FIGS. 9A and 9B.

A second encoder 720 also processes the output text data 306. This second encoder 720 may be similar in architecture to the linguistic encoder 702, but may have a different number and/or type of nodes and layers. The second encoder 720 is trained to determine information relating to the natural-understanding of the output text data 306, such as a vector of values representing the domain, intent, and/or entity corresponding to the output text data 306.

One or more recurrent layers 712 process the output of the second encoder 720. Though drawn separately, the recurrent layers 712 may be wholly or partially inside the second encoder 720. In these embodiments, the recurrent layers 712 may process an intermediate output of the second encoder 720. The recurrent layers 712 may include recurrent elements, such as gated-recurrent units (GRUs) and/or long short-term memories (LSTMs). The recurrent layers 712, by their nature of having recurrent connections, may thus determine an output that corresponds to the entirety of the output text data 306.

One or more feed-forward layers 714 may then receive the output of the recurrent layers 712, along with the NU data 502. The feed-forward layers 714 may be or include, for example, a convolutional neural network (CNN). The output of the feed-forward layers 714 may thus be used to condition the attention network 704 as the linguistic encoder 702 processes the output text data 306. That is, when the linguistic encoder 702 processes data corresponding to a particular word or words of the output text data, the feed-forward layers 714 may instruct the attention network 704 to adjust one or more of its weights to thereby cause a corresponding variation in one or more vocal characteristics represented in the spectrogram data 708.

The attention network 704 may further receive style data 710 that corresponds to one or more general styles of speech. Example styles include "newscaster," "English accent," or "silly voice." The style data 710 may be a one-hot vector; each value of the vector may correspond to a particular style of speech, and only one value of the vector holds a certain value (e.g., 1) while all the other values hold a certain other value (e.g., 0). The attention network 704 may thus use the style data 710 to attend to parts of the linguistic encoder 702 corresponding to the selected style while lowering weights associated with other styles. The style data 710 may be determined by associating one or more of a domain, intent, or entity with a particular style and then indicating that style when that particular domain, intent, or entity is determined.

FIG. 8 illustrates components for training a TTS system according to embodiments of the present disclosure. The output text data 306, style data 710, linguistic encoder 702, attention network 704, speech decoder 706, and spectrogram data 708 correspond to the same components described with reference to FIG. 7. In FIG. 8, however, a reference encoder 810 processes reference spectrogram data 808, which may be a set of training data. The training data may further include annotations that describe vocal characteristics of the reference spectrogram data 808. The reference encoder 810 may be a variational autoencoder (VAE), meaning that it is trained to produce one or more data distributions rather than exact results. By producing these distributions, the reference encoder 810 may produce a more complete data set than would otherwise be possible, especially if the training data is limited. In other words, the reference encoder 810, during training, intelligently "fills in the gaps" between items of training data to thereby estimate additional training data. The output of the reference encoder 810 thus be parameters defining the one or more distributions. In some embodiments, these parameters may include μ, representing the mean of the distribution, and σ, representing the variance of the distribution. The sampling component 812 may then use the parameters to determine a posterior z, which may then be used to train the linguistic encoder 702, attention network 704, and/or speech decoder 706 as they process the output text data 306.

Figure 9A:
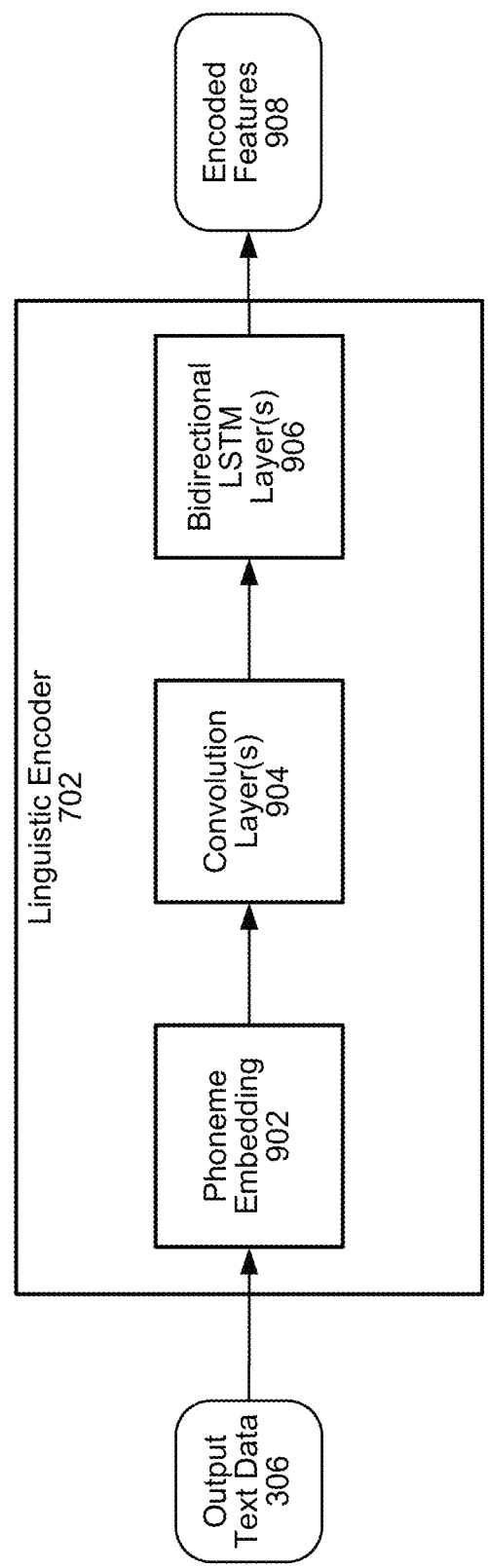
FIGS. 9A and 9B illustrate a linguistic encoder and a speech decoder according to embodiments of the present disclosure.

FIG. 9A illustrates one embodiment of the linguistic encoder 702; the present disclosure is not, however, limited to any particular embodiment of the encoder 702. The other encoders described herein, such as the encoder 602 of FIG. 6 and/or the encoder 720 of FIG. 7, may have similar architectures. The linguistic encoder 702 may receive input data, such as text data 306, and a character embeddings component 902 may create character embeddings based thereon. The character embeddings may represent the text data 306 as a defined list of characters, which may include, for example, English characters (e.g., a-z and A-Z), numbers, punctuation, special characters, and/or unknown characters. The character embeddings may transform the list of characters into one or more corresponding vectors using, for example, one-hot encoding. The vectors may be multi-dimensional; in some embodiments, the vectors represent a learned 512-dimensional character embedding.

The character embeddings may be processed by one or more convolution layer(s) 904, which may apply one or more convolution operations to the vectors corresponding to the character embeddings. In some embodiments, the convolution layer(s) 904 correspond to three convolutional layers each containing 512 filters having shapes of 5×1, i.e., each filter spans five characters. The convolution layer(s) 904 may model longer-term context (e.g., N-grams) in the character embeddings. The final output of the convolution layer(s) 904 (i.e., the output of the only or final convolutional layer) may be passed to bidirectional LSTM layer(s) 906 to generate output data. In some embodiments, the bidirectional LSTM layer 906 includes 512 units: 256 in a first direction and 256 in a second direction.

Figure 9B:
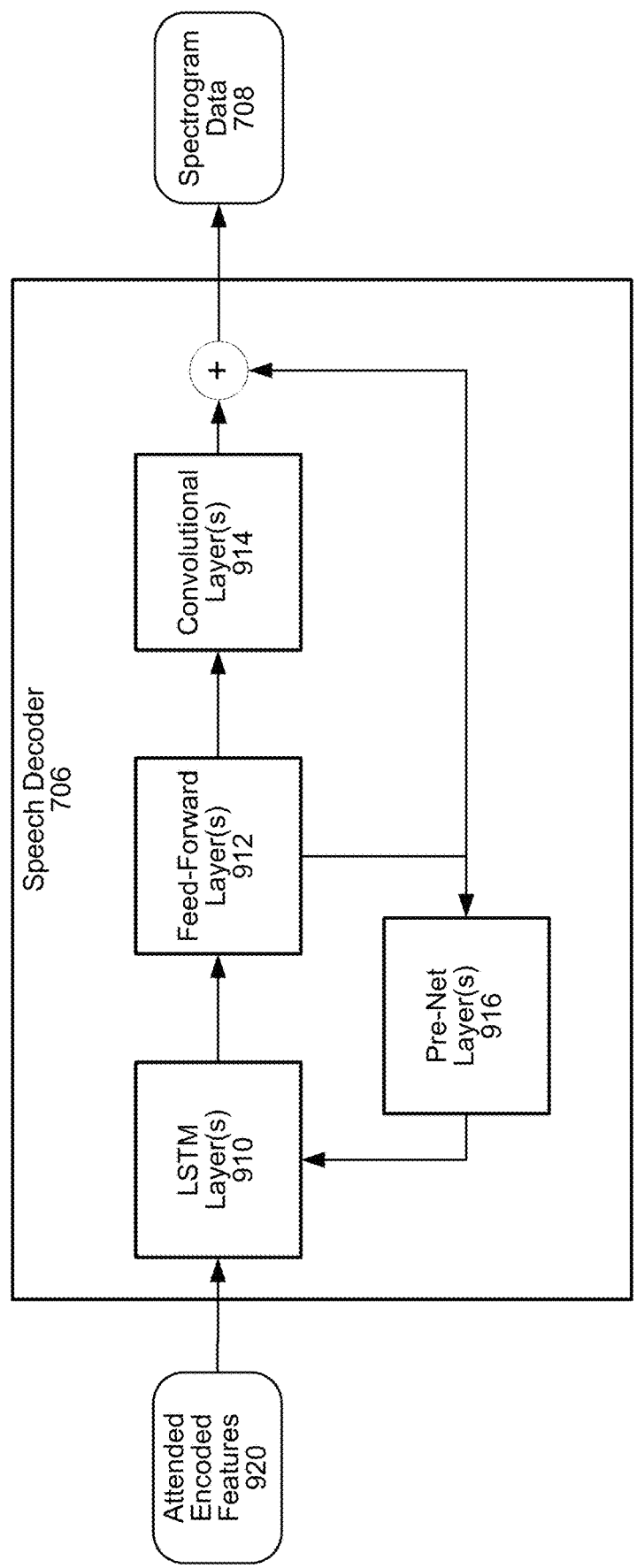

FIG. 9B illustrates one embodiment of one or more of the speech decoder 706; the present disclosure is not, however, limited to any particular embodiment of the decoder 706. The other encoders described herein, such as the decoder 606 of FIG. 6, may have similar architectures. The speech decoder 706 may be a network, such as a neural network; in some embodiments, the decoder is an autoregressive recurrent neural network (RNN). The speech decoder 706 may generate the encoded features 908 from the attended encoded features 920 one frame at a time. The attended encoded features 920 may represent a prediction of frequencies corresponding to the input spectrogram data 306. For example, if the attended encoded features 920 corresponds to speech denoting a fearful emotion, the input spectrogram data 306 may include a prediction of higher frequencies; if the attended encoded features 920 corresponds to speech denoting a whisper, the input spectrogram data 306 may include a prediction of lower frequencies. In some embodiments, the input spectrogram data 306 includes frequencies adjusted in accordance with a Mel scale, in which the input spectrogram data 306 corresponds to a perceptual scale of pitches judged by listeners to be equal in distance from one another. In these embodiments, the input spectrogram data 306 may include or be referred to as a Mel-frequency spectrogram and/or a Mel-frequency cepstrum (MFC).

The speech decoder 706 may include one or more pre-net layers 916. The pre-net layers 916 may include two fully connected layers of 256 hidden units, such as rectified linear units (ReLUs). The pre-net layers 916 receive input spectrogram data 306 from a previous time-step and may act as information bottleneck, thereby aiding the attention network 704 in focusing attention on particular outputs of the attention network 704. In some embodiments, use of the pre-net layer(s) 916 allows the decoder 706 to place a greater emphasis on the output of the attention network 704 and less emphasis on the input spectrogram data 306 from the previous time-temp.

The output of the pre-net layers 916 may be concatenated with the output of the attention network 704. One or more LSTM layer(s) 910 may receive this concatenated output. The LSTM layer(s) 910 may include two uni-directional LSTM layers, each having (e.g.) 1124 units. The output of the LSTM layer(s) 910 may be transformed with a linear transform 912, such as a linear projection. In other embodiments, a different transform, such as an affine transform, may be used. One or more post-net layer(s) 914, which may be convolution layers, may receive the output of the linear transform 912; in some embodiments, the post-net layer(s) 914 include five layers, and each layer includes (e.g.) 512 filters having shapes 5×1 with batch normalization. Tanh activations may be performed on outputs of all but the final layer. A concatenation element may concatenate the output of the post-net layer(s) 914 with the output of the linear transform 912 to generate the spectrogram data 306.

Figure 10:
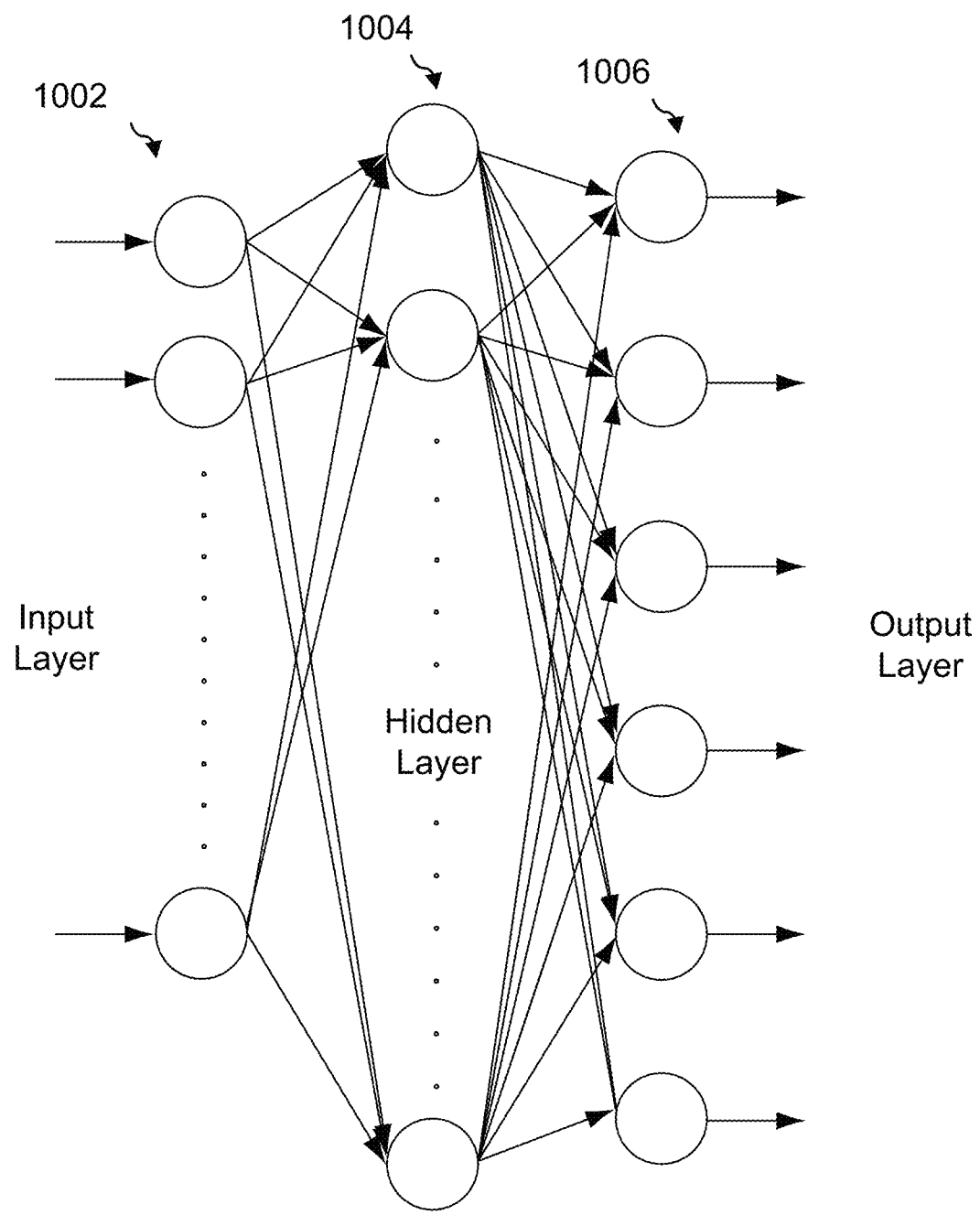
FIG. 10 illustrates a neural network for speech processing according to embodiments of the present disclosure.

An example neural network, which may be the encoder 602, linguistic encoder 702, encoder 720, decoder 606, and/or speech decoder 706, is illustrated in FIG. 10. The neural network may include nodes organized as an input layer 1002, one or more hidden layer(s) 1004, and an output layer 1006. The input layer 1002 may include m nodes, the hidden layer(s) 1004 n nodes, and the output layer 1006 o nodes, where m, n, and o may be any numbers and may represent the same or different numbers of nodes for each layer. Nodes of the input layer 1002 may receive inputs (e.g., the audio data 302), and nodes of the output layer 1006 may produce outputs (e.g., the input spectrogram data 306). Each node of the hidden layer(s) 1004 may be connected to one or more nodes in the input layer 1002 and one or more nodes in the output layer 1004. Although the neural network illustrated in FIG. 10 includes a single hidden layer 1004, other neural networks may include multiple hidden layers 1004; in these cases, each node in a hidden layer may connect to some or all nodes in neighboring hidden (or input/output) layers. Each connection from one node to another node in a neighboring layer may be associated with a weight and/or score. A neural network may output one or more outputs, a weighted set of possible outputs, or any combination thereof.

The neural network may also be constructed using recurrent connections such that one or more outputs of the hidden layer(s) 1004 of the network feeds back into the hidden layer(s) 1004 again as a next set of inputs. Each node of the input layer connects to each node of the hidden layer; each node of the hidden layer connects to each node of the output layer. As illustrated, one or more outputs of the hidden layer is fed back into the hidden layer for processing of the next set of inputs. A neural network incorporating recurrent connections may be referred to as a recurrent neural network (RNN).

Processing by a neural network is determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with a lattice to improve speech recognition when the entire lattice is processed.

Figure 11:
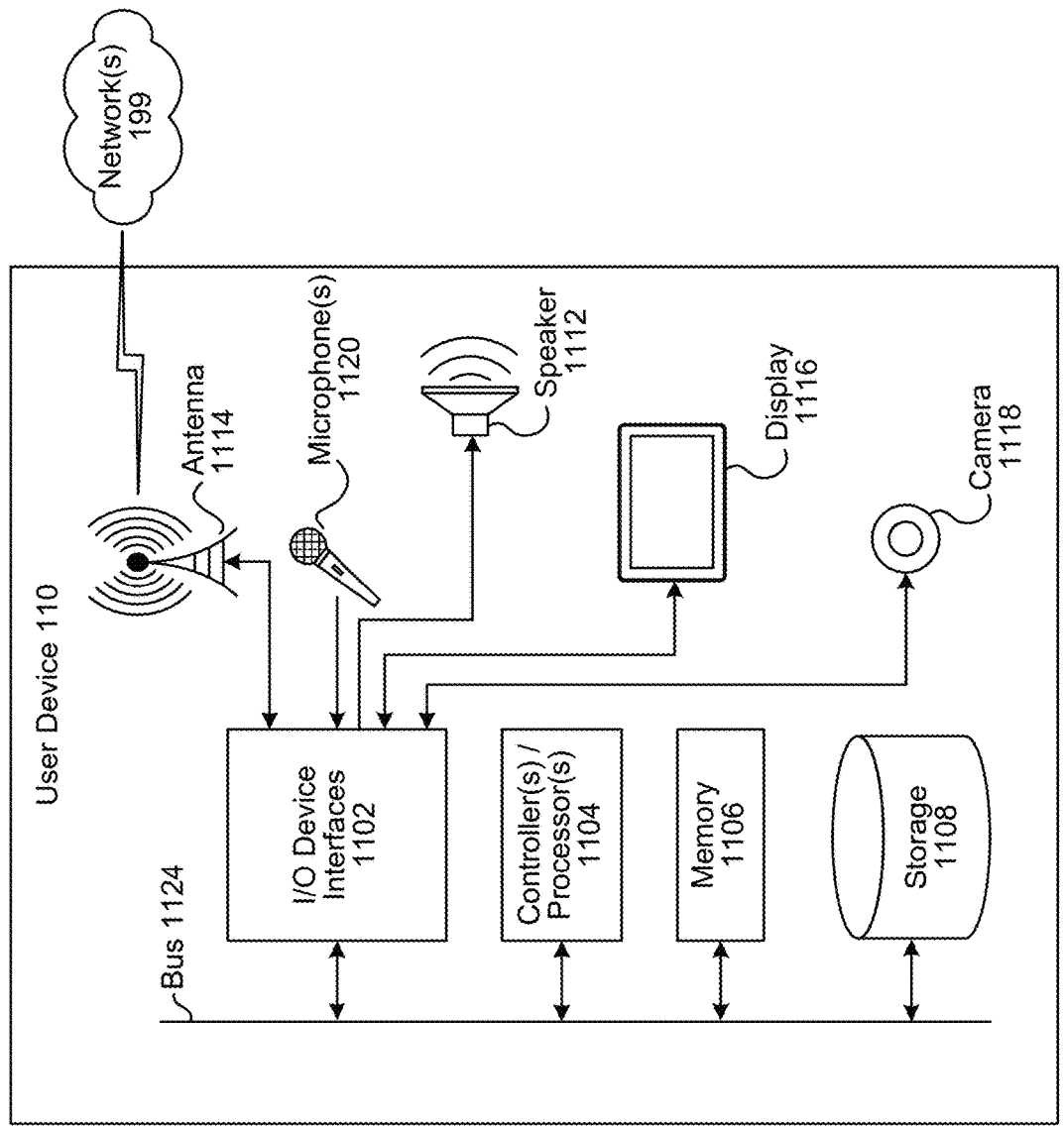
FIG. 11 illustrates components of a user device for speech processing according to embodiments of the present disclosure.
Figure 12:
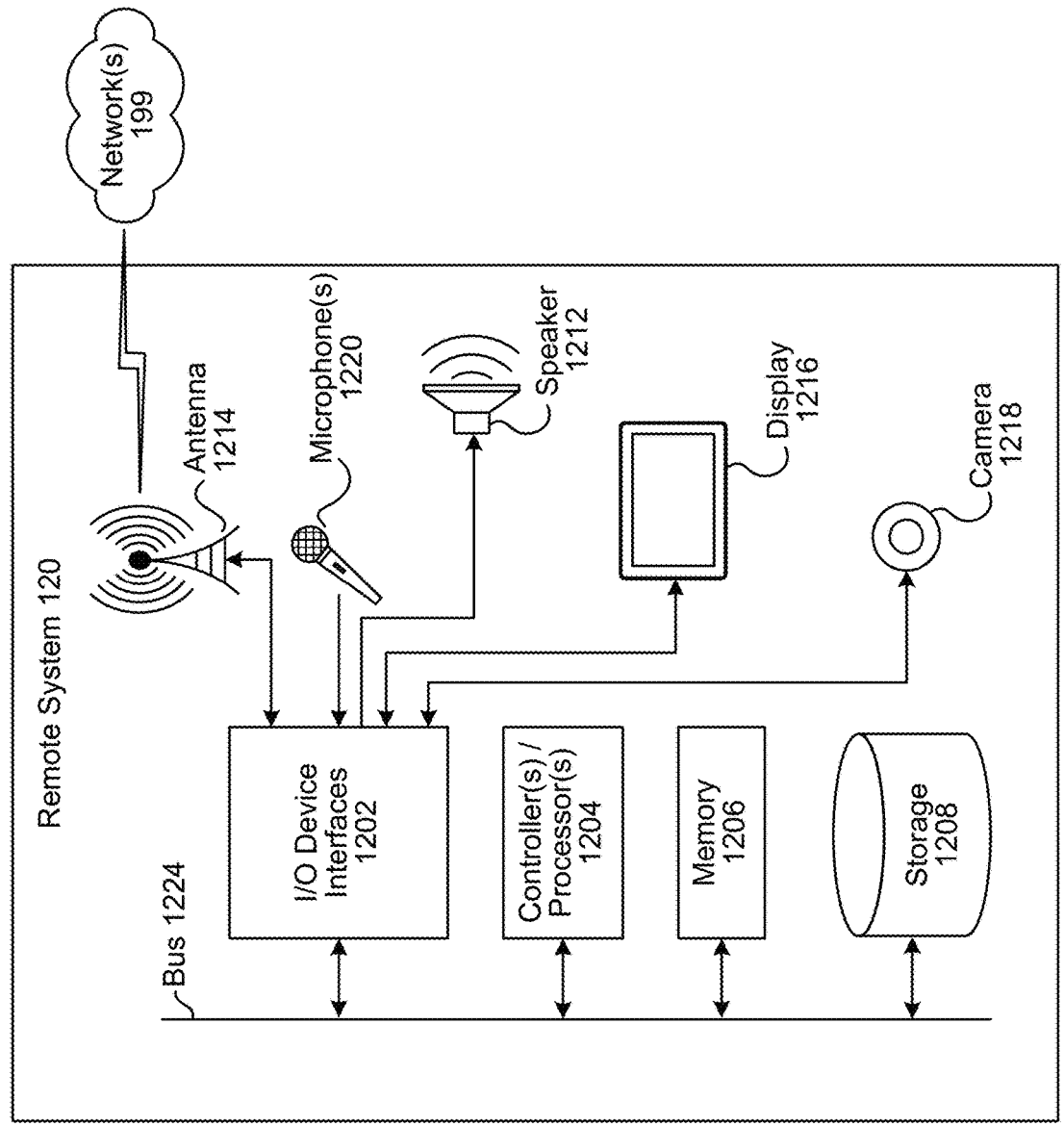
FIG. 12 illustrates components of a remote system for speech processing according to embodiments of the present disclosure.

FIG. 11 is a block diagram conceptually illustrating a user device 110. FIG. 12 is a block diagram conceptually illustrating example components of the remote system 120, which may be one or more servers and which may assist with TTS processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing speech processing. In operation, each of these server (or groups of devices) may include computer-readable and computer-executable instructions that reside on the respective server, as will be discussed further below. Each of these devices/systems (110/120) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1102/1202). The device 110 may further include loudspeaker(s) 1112, microphone(s) 1120, display(s) 1116, and/or camera(s) 1118. The remote system 120 may similarly include antenna(s) 1214, loudspeaker(s) 1212, microphone(s) 1220, display(s) 1216, and/or camera(s) 1218.

Computer instructions for operating each device/system (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device/system (110/120) includes input/output device interfaces (1102/1202). A variety of components may be connected through the input/output device interfaces (1102/1202), as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Figure 13:
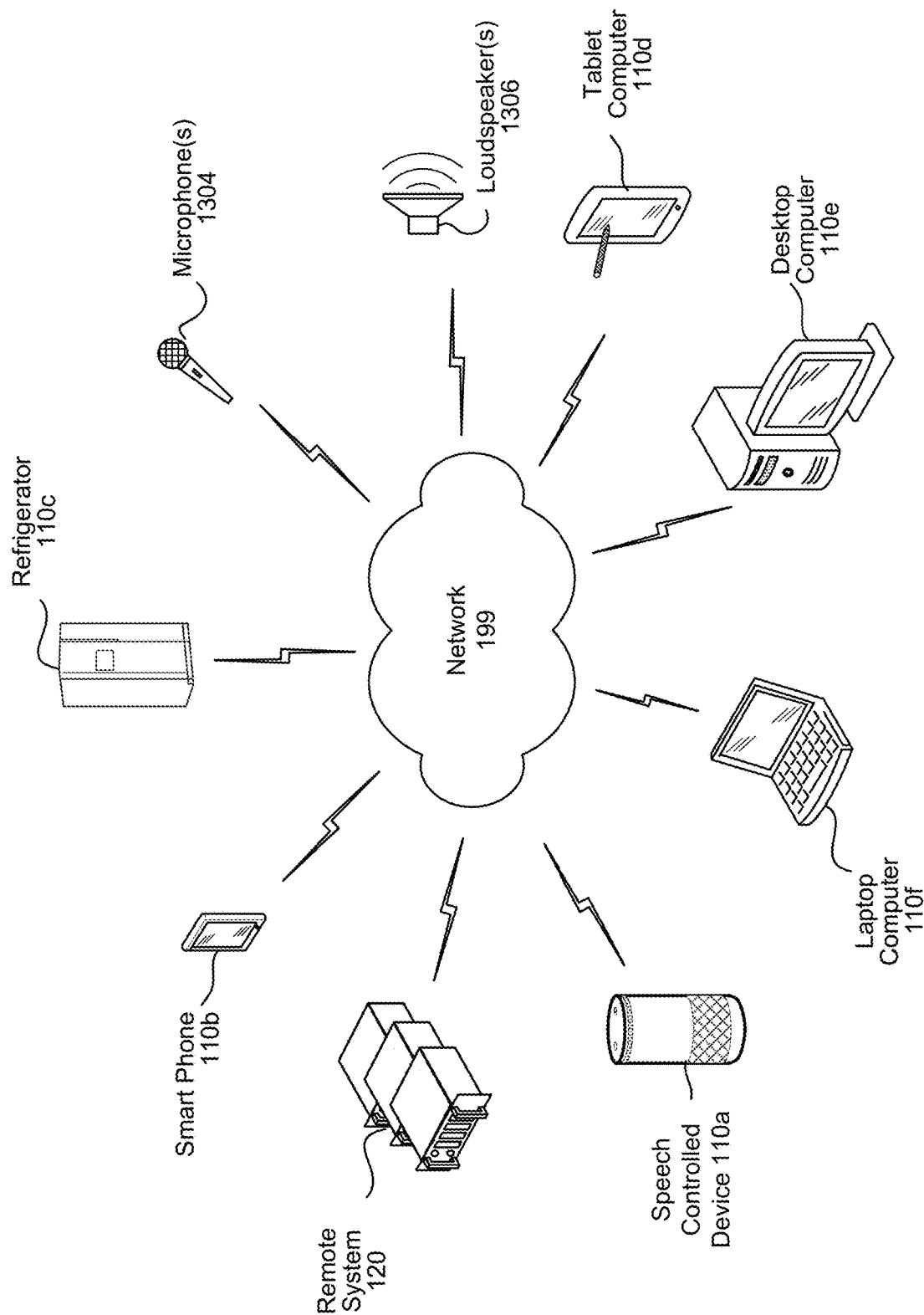
FIG. 13 illustrates a networked computing environment according to embodiments of the present disclosure.

Referring to FIG. 13, the device 110 may include input/output device interfaces 1102 that connect to a variety of components such as an audio output component (e.g., a microphone 1304 and/or a loudspeaker 1306), a wired headset, and/or a wireless headset (not illustrated), or other component capable of outputting audio. The device 110 may also include an audio capture component. The audio capture component may be, for example, the microphone 1120 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display for displaying content. The device 110 may further include a camera.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical systems in a collection of systems or other components.

The components of the device(s) 110 and/or the system 120 may include their own dedicated processors, memory, and/or storage. Alternatively, one or more of the components of the device(s) 110 and/or the system 120 may utilize the I/O interfaces (1102/1202), processor(s) (1104/1204), memory (1106/1116), and/or storage (1108/1208) of the device(s) 110 and/or system 120.

As noted above, multiple devices may be employed in a single system. In such a multi-device system, each of the devices may include different components for performing different aspects of the system's processing. The multiple devices may include overlapping components. The components of the device 110 and/or the system 120, as described herein, are illustrative, and may be located as a stand-alone device or may be included, in whole or in part, as a component of a larger device or system.

The network 199 may further connect a speech controlled device 110a, a tablet computer 110d, a smart phone 110b, a refrigerator 110c, a desktop computer 110e, and/or a laptop computer 110f through a wireless service provider, over a WiFi or cellular network connection, or the like. Other devices may be included as network-connected support devices, such as a system 120. The support devices may connect to the network 199 through a wired connection or wireless connection. Networked devices 110 may capture audio using one-or-more built-in or connected microphones and/or audio-capture devices, with processing performed by components of the same device or another device connected via network 199. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware, such as the acoustic front end, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating speech, the method comprising:
   receiving, from a user device, first audio data representing a command;
   processing the first audio data using an automatic speech-recognition (ASR) component to determine first text data representing the speech;
   processing the first text data using a natural-language understanding (NLU) component to determine natural-understanding data comprising a representation of an entity in the first text data;
   processing the natural-understanding data using a dialog manager component to determine second text data representing a response to the first audio data, wherein the response includes a reference to the entity;
   processing the second text data with a linguistic encoder of a text-to-speech (TTS) component to determine first encoded data representing words in the command;
   processing the second text data with a second encoder of the TTS component to determine second encoded data corresponding to the natural-understanding data;
   processing the first encoded data, the second encoded data, and the natural-understanding data with an attention network of the TTS component to determine weighted encoded data, the weighted encoded data corresponding to a variation in synthetic speech that places an emphasis on a name of the entity; and
   processing the weighted encoded data with a speech decoder of the TTS component to determine second audio data, the second audio data corresponding to a the variation in the synthetic speech.

2. The computer-implemented method of claim 1, further comprising:
   processing second NLU data using the dialog manager component to determine third text data representing a second response to a second command;
   processing the third text data and second natural-understanding data with a rephrasing component to determine fourth text data, the fourth text data including a representation of the entity and at least a first word unrepresented in the third text data; and processing the fourth text data with the TTS component to determine third audio data.

3. The computer-implemented method of claim 1, further comprising:

processing third text data using the NLU component to determine second natural-understanding data comprising an intent to repeat a word represented in the first audio data;

processing the second natural-understanding data using the dialog manager component to determine fourth text data representing a response to the third text data;

processing the second natural-understanding data with the attention network to determine second weighted encoded data, the second weighted encoded data corresponding to the emphasis on the word; and processing the second weighted encoded data with the speech decoder to determine third audio data, the third audio data corresponding to a second vocal characteristic associated with the word.

4. The computer-implemented method of claim 1, further comprising:

determining a domain associated with the natural-understanding data;

determining that first data stored in a computer memory indicates that a style of speech is associated with the domain;

determining second data representing the style of speech, wherein the weighted encoded data is further based at least in part on the second data.

5. A computer-implemented method comprising:

receiving first input data corresponding to a response to a command;

receiving second input data comprising a machine representation of the command;

processing the first input data with a first model to determine first encoded data representing words;

processing the first input data with a second model to determine second encoded data corresponding to the second input data;

processing the first encoded data using the second encoded data and the second input data to determine third encoded data; and processing the third encoded data with a third model to determine audio data, the audio data corresponding to a variation in synthesized speech associated with the second input data.

6. The computer-implemented method of claim 5, further comprising:

processing the audio data using a vocoder to determine output audio data; and causing output of the output audio data.

7. The computer-implemented method of claim 5, further comprising:

receiving third input data corresponding to a second response to a second command;

processing the third input data with a fourth model to determine fourth input data different from the third input data, the fourth input data corresponding to the second input data; and processing the fourth input data with the first model, the second model, and the third model to determine second audio data.

8. The computer-implemented method of claim 7, further comprising:

prior to processing the third input data and, determining that the response corresponds to the second response and that the command corresponds to the second command.

9. The computer-implemented method of claim 5, further comprising:

determining a style of speech associated with a domain associated with the response;

wherein the third encoded data is further based at least in part on the style of speech.

10. The computer-implemented method of claim 5, further comprising:

determining a score representing a degree of the variation; and determining that the score is less than a threshold.

11. The computer-implemented method of claim 5, wherein processing the first input data with the second model further comprises:

processing an intermediate output of the second model with at least one recurrent layer.

12. The computer-implemented method of claim 5, further comprising:

processing the second input data and fourth encoded data with the third model to determine second audio data, the second audio data corresponding to a second variation in the synthesized speech associated with fourth input data.

13. A system comprising:

at least one processor; and at least one memory including instructions that, when executed by the at least one processor, cause the system to:

receive first input data corresponding to a response to a command;

receive second input data comprising a machine representation of the command;

process the first input data with a first model to determine first encoded data representing words;

process the first input data with a second model to determine second encoded data corresponding to the second input data;

process the first encoded data using the second encoded data and the second input data with an attention network to determine third encoded data; and process the third encoded data with a third model to determine audio data, the audio data corresponding to a variation in synthesized speech associated with the second input data.

14. The system of claim 13, wherein the at least one memory further includes instructions that, when executed by the at least one processor, further cause the system to:

process the audio data using a vocoder to determine output audio data; and cause output of the output audio data.

15. The system of claim 13, wherein the at least one memory further includes instructions that, when executed by the at least one processor, further cause the system to:

receive third input data corresponding to a second response to a second command;

process the third input data with a fourth model to determine fourth input data different from the third input data; and process the fourth input data with the first model, the second model, and the third model to determine second audio data.

16. The system of claim 15, wherein the at least one memory further includes instructions that, when executed by the at least one processor, further cause the system to:
prior to processing the third input data and, determine that the response corresponds to the second response and that the command corresponds to the second command.

17. The system of claim 13, wherein the at least one memory further includes instructions that, when executed by the at least one processor, further cause the system to:
determine a style of speech associated with a domain associated with the response;
wherein the third encoded data is further based at least in part on the style of speech.

18. The system of claim 13, wherein the at least one memory further includes instructions that, when executed by the at least one processor, further cause the system to:
determine a score representing a degree of the variation; and
determine that the score is less than a threshold.

19. The system of claim 13, wherein the at least one memory further includes instructions that, when executed by the at least one processor, further cause the system to:
process an intermediate output of the second model with at least one recurrent layer.

20. The system of claim 13, wherein the at least one memory further includes instructions that, when executed by the at least one processor, further cause the system to:
process the second input data and fourth encoded data with the third model to determine second audio data, the second audio data corresponding to a second variation in the synthesized speech associated with fourth input data.

* * * * *